(12) United States Patent
Tseng et al.

(10) Patent No.: US 12,052,486 B2
(45) Date of Patent: Jul. 30, 2024

(54) ELECTRONIC DEVICE WITH DOUBLE APERTURE REGIONS

(71) Applicant: LARGAN PRECISION CO., LTD., Taichung (TW)

(72) Inventors: Yu-Tai Tseng, Taichung (TW); Lin-An Chang, Taichung (TW); Ming-Ta Chou, Taichung (TW); Hsiang-Chi Tang, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 249 days.

(21) Appl. No.: 17/828,068

(22) Filed: May 31, 2022

(65) Prior Publication Data

US 2023/0026033 A1    Jan. 26, 2023

Related U.S. Application Data

(60) Provisional application No. 63/222,492, filed on Jul. 16, 2021.

(51) Int. Cl.
*H04N 23/55* (2023.01)
*G02B 7/02* (2021.01)
*H04M 1/02* (2006.01)
*H04N 23/54* (2023.01)

(52) U.S. Cl.
CPC ............. *H04N 23/55* (2023.01); *G02B 7/021* (2013.01); *H04M 1/0264* (2013.01); *H04N 23/54* (2023.01)

(58) Field of Classification Search
CPC ........ H04N 23/55; H04N 23/54; G02B 7/021; H04M 1/0264; H04M 1/0266; G03B 30/00; G03B 35/08; G03B 19/22; G06F 1/1626; G06F 1/163; G06F 1/1686
See application file for complete search history.

(56) References Cited

U.S. PATENT DOCUMENTS

| | | |
|---|---|---|
| 9,398,264 B2 | 7/2016 | Georgiev et al. |
| 9,838,601 B2 | 12/2017 | Georgiev et al. |
| 9,973,669 B2 | 5/2018 | Vittu |
| 10,063,756 B2 | 8/2018 | Kim et al. |

(Continued)

FOREIGN PATENT DOCUMENTS

| | | |
|---|---|---|
| CN | 108512962 A | 9/2018 |
| CN | 209167633 U | 7/2019 |
| CN | 209167769 U | 7/2019 |

*Primary Examiner* — Gevell V Selby
(74) *Attorney, Agent, or Firm* — McClure, Qualey & Rodack, LLP

(57) ABSTRACT

An electronic device includes a display screen, a first aperture region and a second aperture region. The display screen is disposed on a surface of the electronic device. The first aperture region is disposed on the surface of the electronic device, and a visible light is able to enter into an internal portion of the electronic device through the first aperture region. The second aperture region is disposed on the surface of the electronic device, and the visible light is able to enter into the internal portion of the electronic device through the second aperture region. The display screen is disposed between the first aperture region and the second aperture region and configured to be a spacing maintained therebetween, and a shape of the first aperture region and a shape of the second aperture region are non-circular and mirror-symmetrical to each other.

25 Claims, 27 Drawing Sheets

(56) References Cited

U.S. PATENT DOCUMENTS

| | | |
|---|---|---|
| 10,436,954 B2 | 10/2019 | Shih et al. |
| 10,473,880 B2 | 11/2019 | Yang et al. |
| 10,582,104 B2 | 3/2020 | Kim et al. |
| 11,330,159 B2 | 5/2022 | Yang et al. |
| 2003/0021041 A1 | 1/2003 | Bos |
| 2017/0026634 A1* | 1/2017 | Mirlay .................. H04N 23/55 |
| 2019/0179098 A1 | 6/2019 | Yang et al. |
| 2019/0179103 A1 | 6/2019 | Yang et al. |
| 2020/0033548 A1 | 1/2020 | Yang et al. |
| 2021/0004051 A1* | 1/2021 | Solomon ................ H04N 23/54 |
| 2021/0314466 A1* | 10/2021 | Kramer .................. H04N 23/57 |

\* cited by examiner

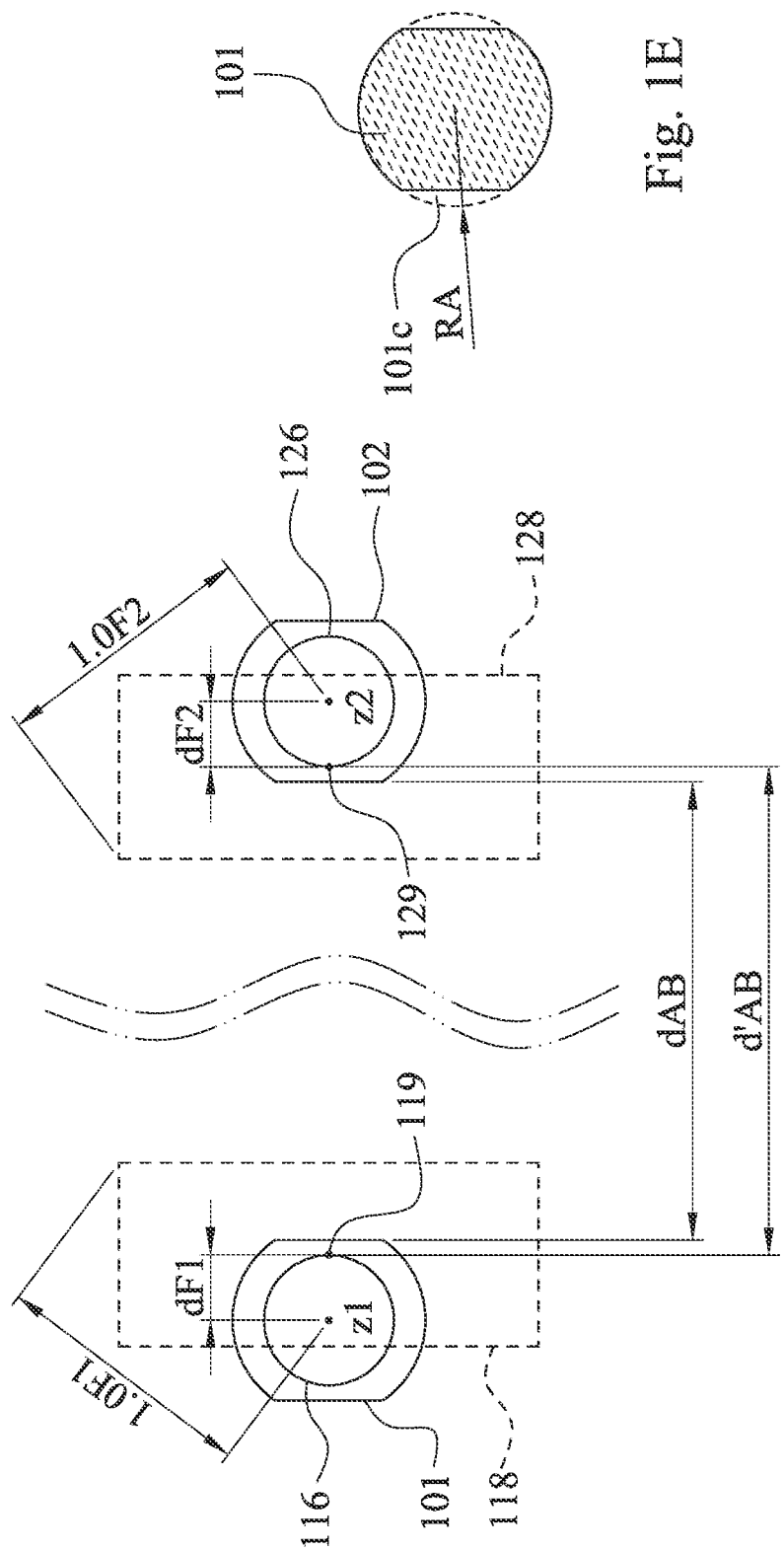

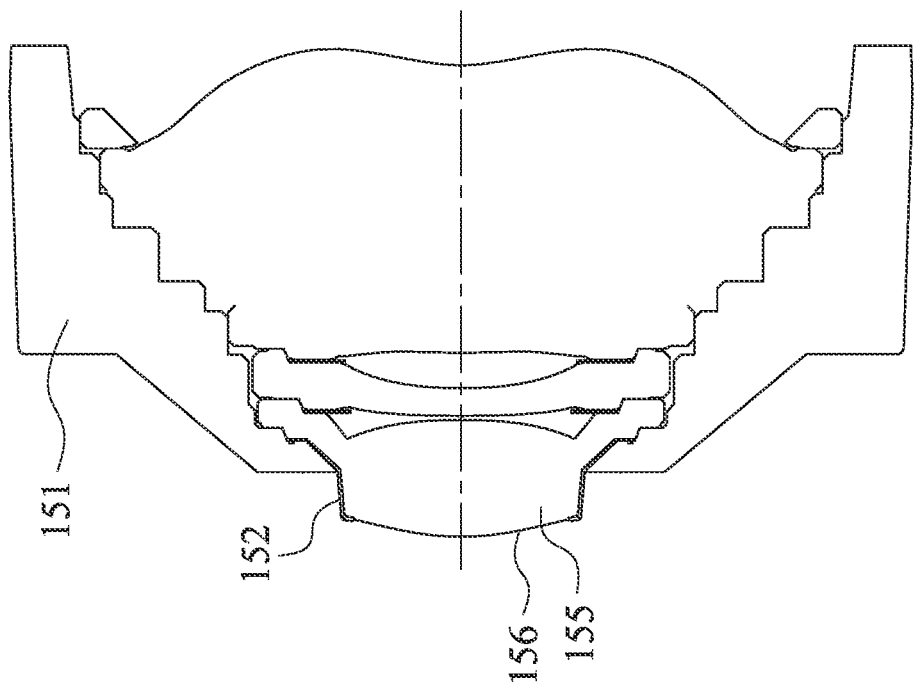

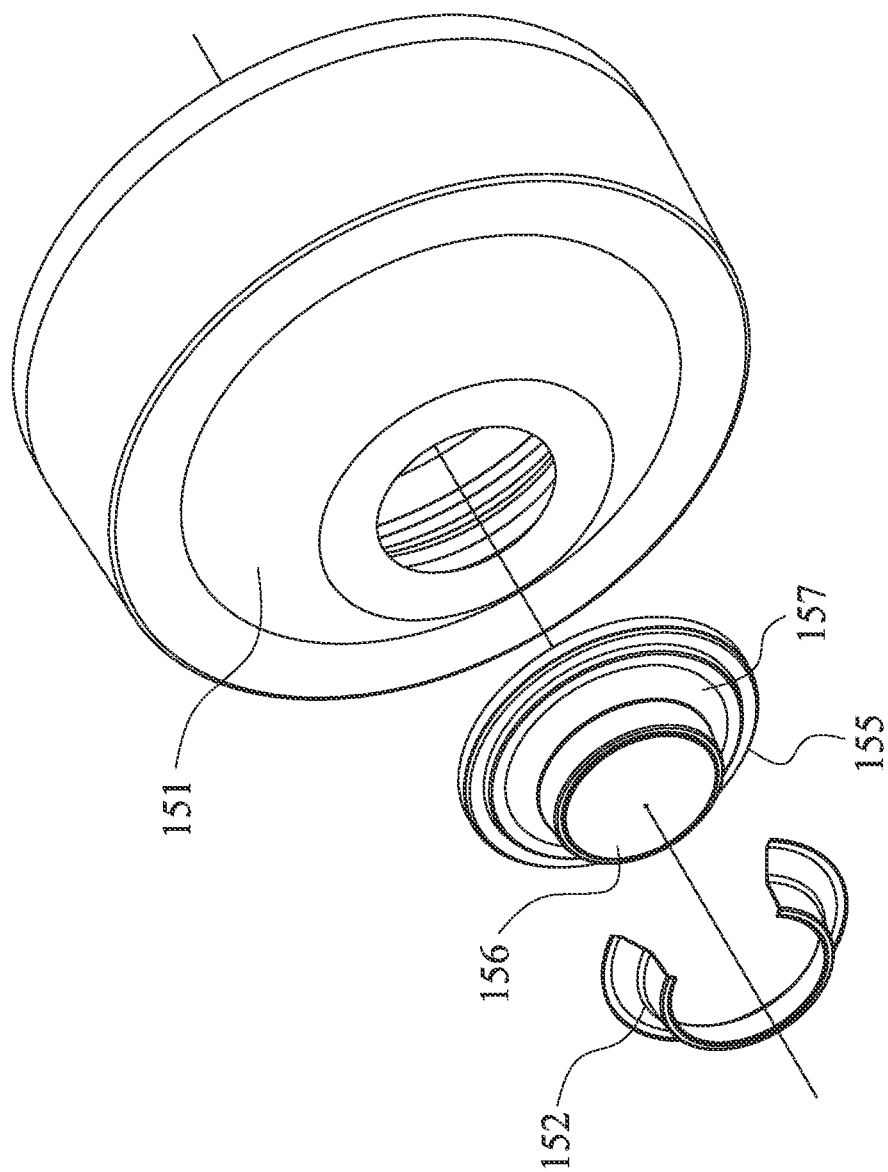

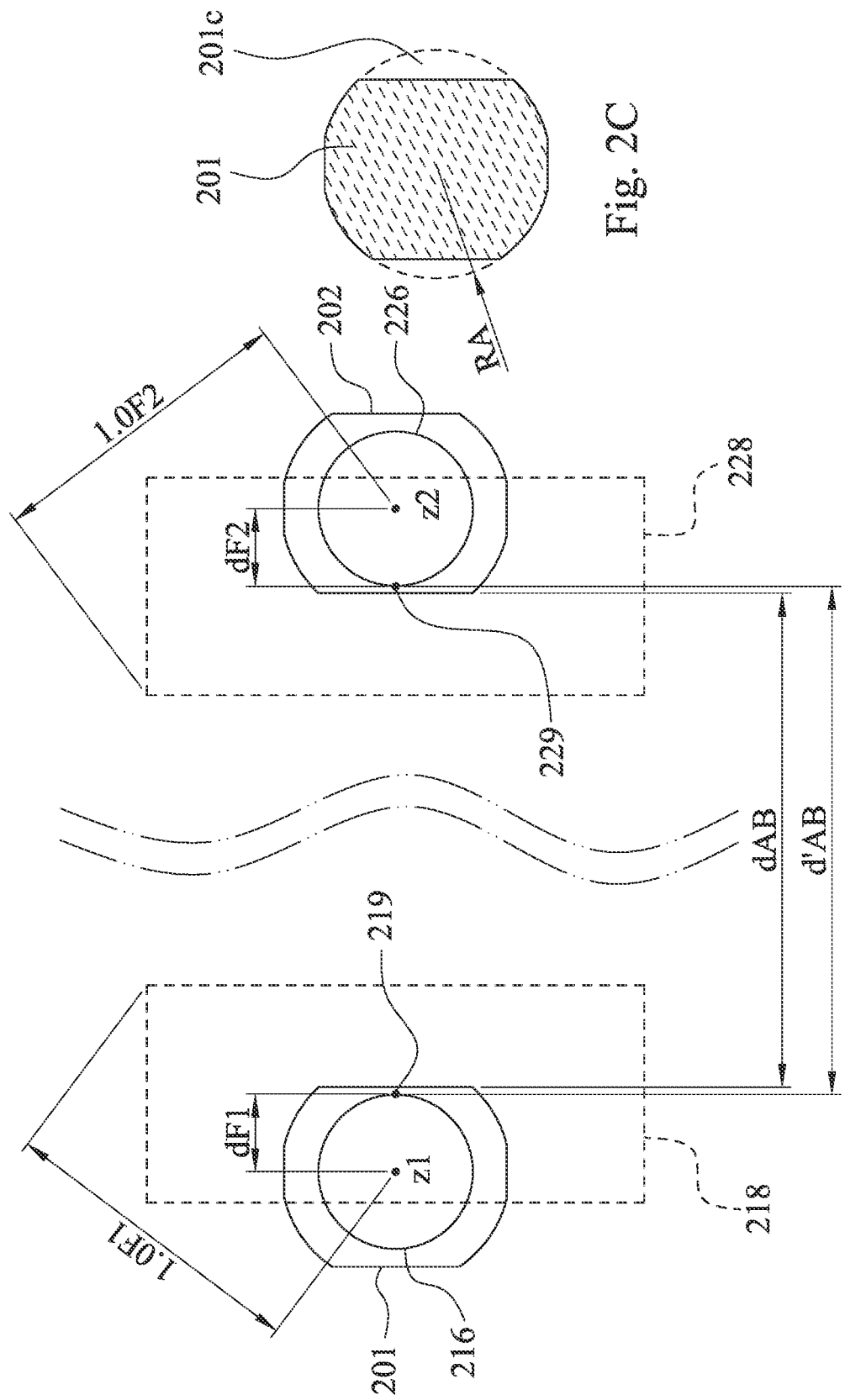

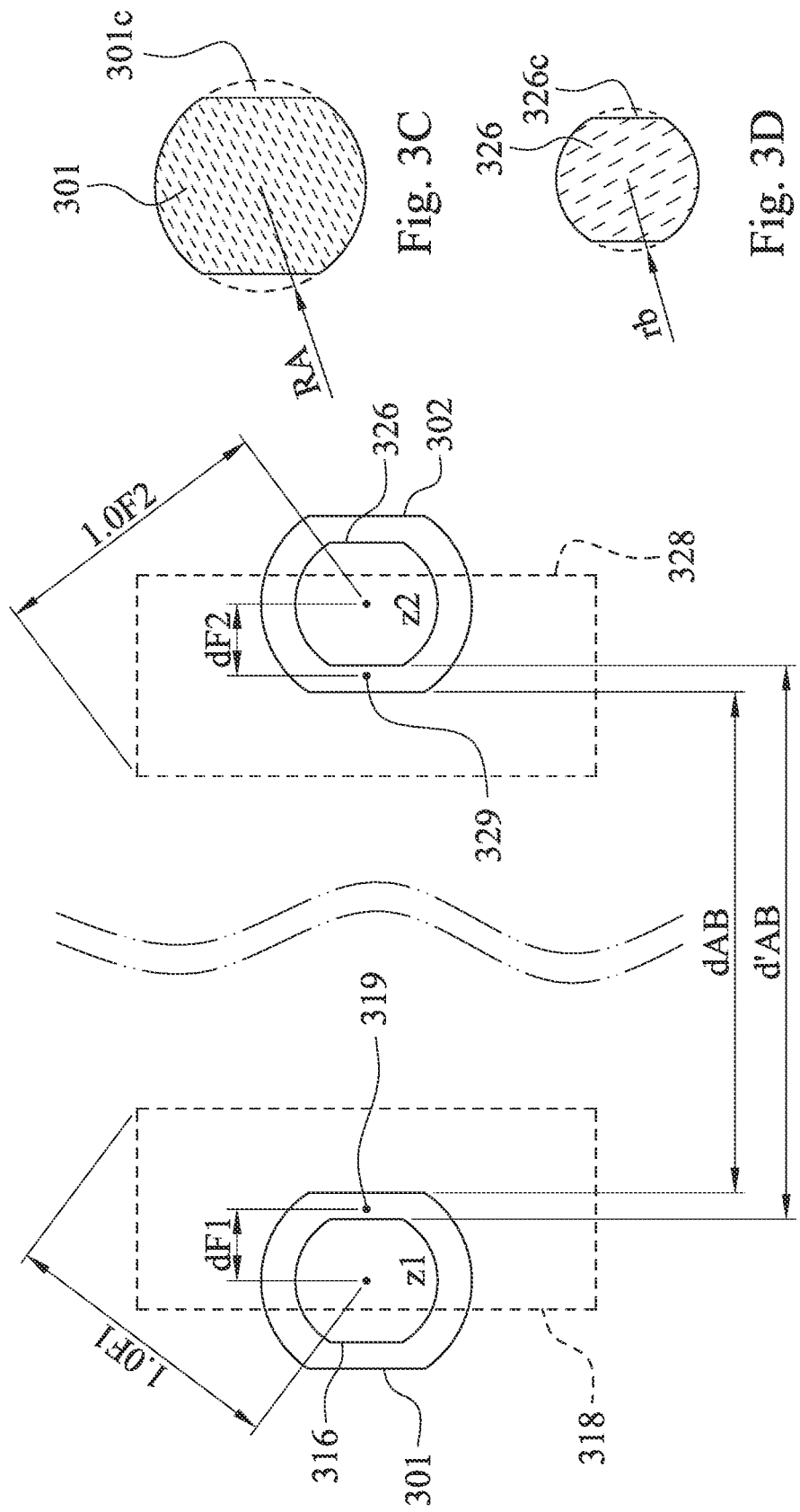

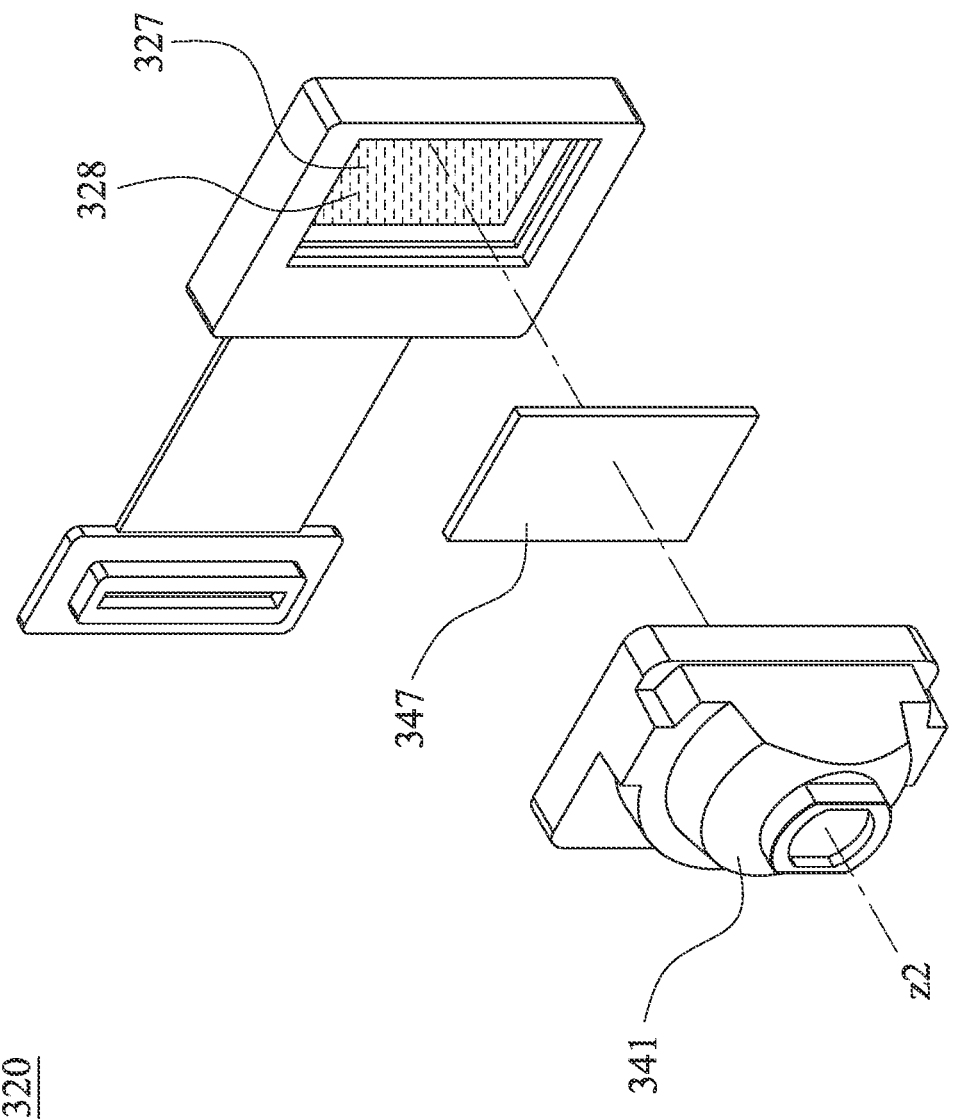

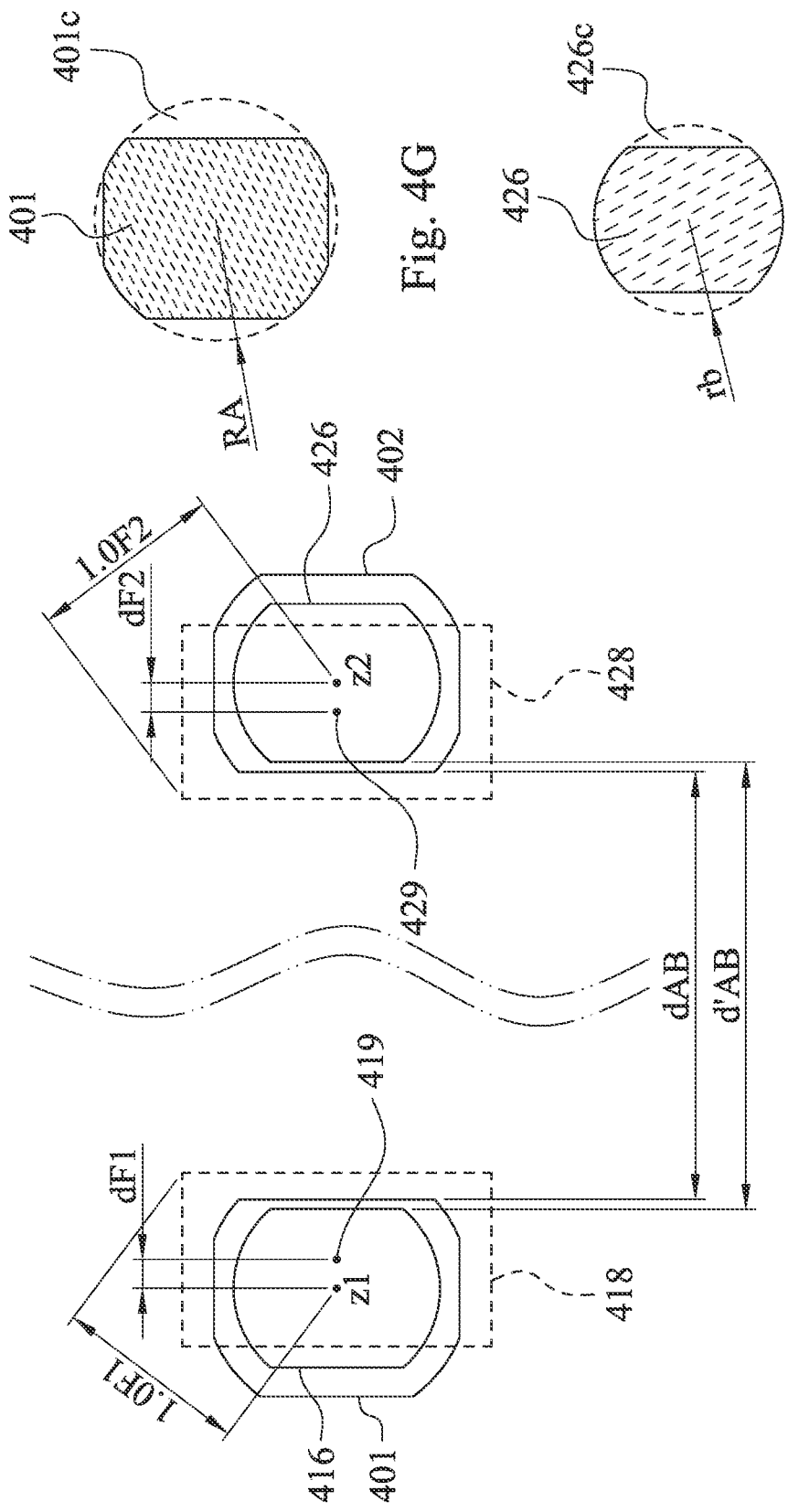

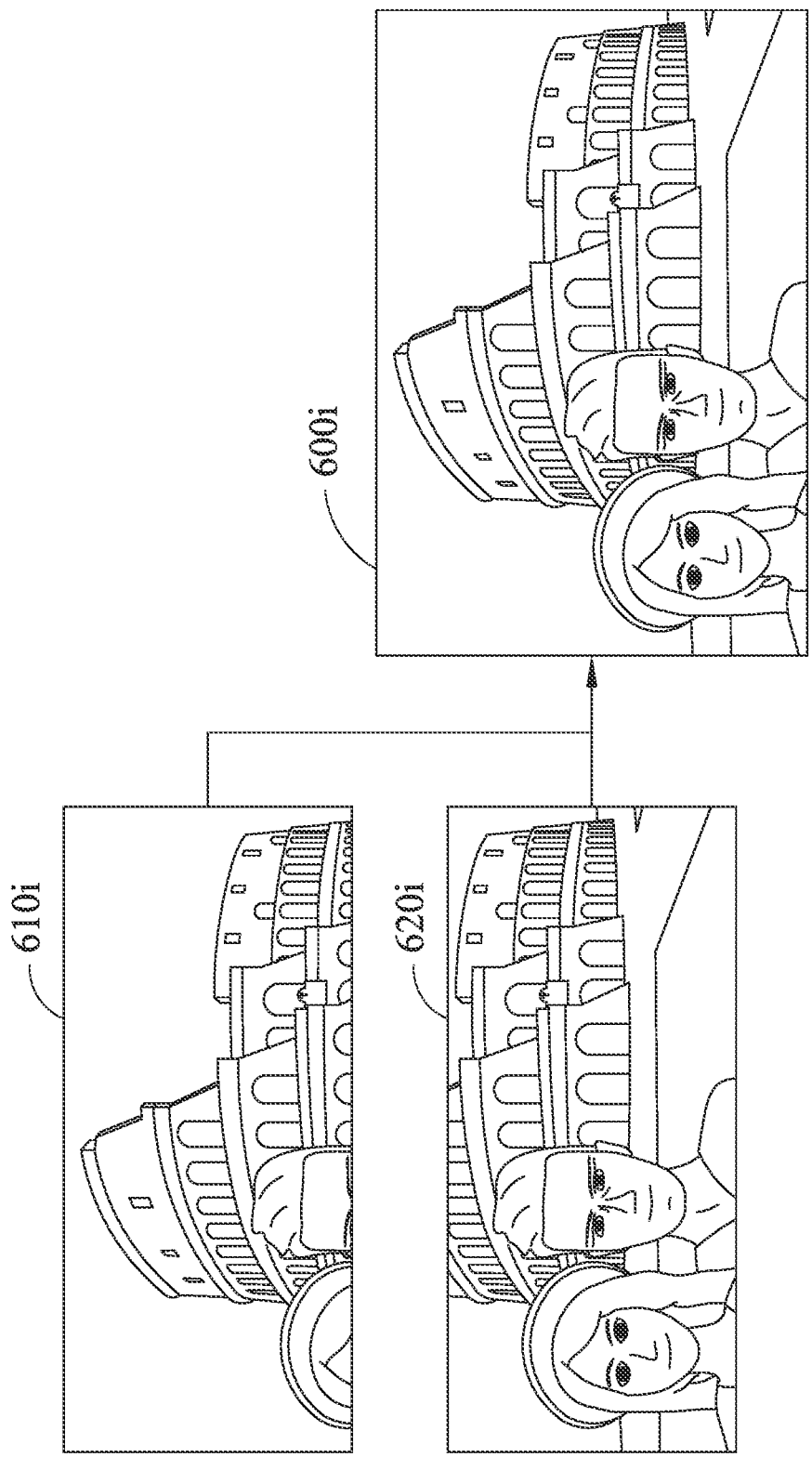

ELECTRONIC DEVICE WITH DOUBLE APERTURE REGIONS

RELATED APPLICATIONS

This application claims priority to U.S. Provisional Application Ser. No. 63/222,492, filed Jul. 16, 2021, which is herein incorporated by reference.

BACKGROUND

Technical Field

The present disclosure relates to an electronic device. More particularly, the present disclosure relates to a portable electronic device.

Description of Related Art

In recent years, portable electronic devices have developed rapidly. For example, intelligent electronic devices and tablets have been filled in the lives of modern people, and imaging lens assemblies thereof mounted on portable electronic devices have also prospered. However, as technology advances, the quality requirements of the electronic devices and the imaging lens assemblies thereof are becoming higher and higher. Therefore, an electronic device with an imaging lens assembly, which can balance the compact size and the image quality, needs to be developed.

SUMMARY

According to one aspect of the present disclosure, an electronic device includes a display screen, a first aperture region and a second aperture region. The display screen is disposed on a surface of the electronic device. The first aperture region is disposed on the surface of the electronic device, and a visible light is able to enter into an internal portion of the electronic device through the first aperture region. The second aperture region is disposed on the surface of the electronic device, and the visible light is able to enter into the internal portion of the electronic device through the second aperture region. The display screen is disposed between the first aperture region and the second aperture region and configured to be a spacing maintained therebetween, and a shape of the first aperture region and a shape of the second aperture region are non-circular and mirror-symmetrical to each other. When the spacing between the first aperture region and the second aperture region is dAB, a shortest straight-line distance defined by the display screen is dmin, and a longest straight-line distance defined by the display screen is dmax, the following conditions are satisfied: 0.84×dmin<dAB<1.31×dmax, and 0.47×dmax<dmin<dmax.

According to another aspect of the present disclosure, an electronic device includes a display screen, a first aperture region, a second aperture region, a first imaging lens assembly and a second imaging lens assembly. The display screen is disposed on a surface of the electronic device. The first aperture region is disposed on the surface of the electronic device, and a visible light is able to enter into an internal portion of the electronic device through the first aperture region. The second aperture region is disposed on the surface of the electronic device, and the visible light is able to enter into the internal portion of the electronic device through the second aperture region. The first imaging lens assembly is located in the internal portion of the electronic device and faces the first aperture region. The second imaging lens assembly is located in the internal portion of the electronic device and faces the second aperture region. The display screen is disposed between the first imaging lens assembly and the second imaging lens assembly and configured to be a spacing maintained therebetween, and a shape of a first opening of the first imaging lens assembly and a shape of a second opening of the second imaging lens assembly are non-circular and mirror-symmetrical to each other. When the spacing between the first imaging lens assembly and the second imaging lens assembly is d'AB, a shortest straight-line distance defined by the display screen is dmin, and a longest straight-line distance defined by the display screen is dmax, the following conditions are satisfied: 0.84×dmin<d'AB<1.26×dmax, and 0.47×dmax<dmin<dmax.

According to further another aspect of the present disclosure, an electronic device includes a display screen, a first aperture region, a second aperture region, a first imaging lens assembly and a second imaging lens assembly. The display screen is disposed on a surface of the electronic device. The first aperture region is disposed on the surface of the electronic device, and a visible light is able to enter into an internal portion of the electronic device through the first aperture region. The second aperture region is disposed on the surface of the electronic device, and the visible light is able to enter into the internal portion of the electronic device through the second aperture region. The first imaging lens assembly is located in the internal portion of the electronic device and faces the first aperture region. The second imaging lens assembly is located in the internal portion of the electronic device and faces the second aperture region. The display screen is disposed between the first imaging lens assembly and the second imaging lens assembly and configured to be a spacing maintained therebetween. When the spacing between the first imaging lens assembly and the second imaging lens assembly is d'AB, a shortest straight-line distance defined by the display screen is dmin, a longest straight-line distance defined by the display screen is dmax, a focal length of the first imaging lens assembly is efl1, and a focal length of the second imaging lens assembly is efl2, the following conditions are satisfied: 0.83×dmin<d'AB<1.26×dmax; 0.47×dmax<dmin<dmax, 2.0 mm≤efl1≤4.2 mm; 2.0 mm≤efl2≤4.2 mm; and 0.8<efl1/efl2<1.25.

BRIEF DESCRIPTION OF THE DRAWINGS

The present disclosure can be more fully understood by reading the following detailed description of the embodiment, with reference made to the accompanying drawings as follows:

FIG. 1D is a schematic view of parameters of the electronic device in FIG. 1A according to the 1st embodiment.

FIG. 1E is a schematic view of a first aperture region of the electronic device according to the 1st embodiment.

FIG. 1H is a partially schematic view of another imaging lens assembly being able to be configured in the electronic device according to the 1st embodiment.

FIG. 1I is a partially exploded view of the imaging lens assembly in FIG. 1H.

FIG. 2B is a schematic view of parameters of the electronic device in FIG. 2A according to the 2nd embodiment.

FIG. 2C is a schematic view of a first aperture region of the electronic device according to the 2nd embodiment.

FIG. 3B is a schematic view of parameters of the electronic device in FIG. 3A according to the 3rd embodiment.

FIG. 3C is a schematic view of a first aperture region of the electronic device according to the 3rd embodiment.

FIG. 3D is a schematic view of a second opening of the electronic device according to the 3rd embodiment.

FIG. 3E is an exploded view of a second imaging lens assembly of the electronic device according to the 3rd embodiment.

FIG. 4F is a schematic view of parameters of the electronic device in FIG. 4A according to the 1st embodiment.

FIG. 4G is a schematic view of a first aperture region of the electronic device according to the 4th embodiment.

FIG. 4H is a schematic view of a second opening of the electronic device according to the 4th embodiment.

FIG. 6D is a schematic view of a single display image merged with a captured image of a first imaging lens assembly and a captured image of a second imaging lens assembly of the electronic device in FIG. 6A according to the 6th embodiment.

DETAILED DESCRIPTION

Figure 1A:
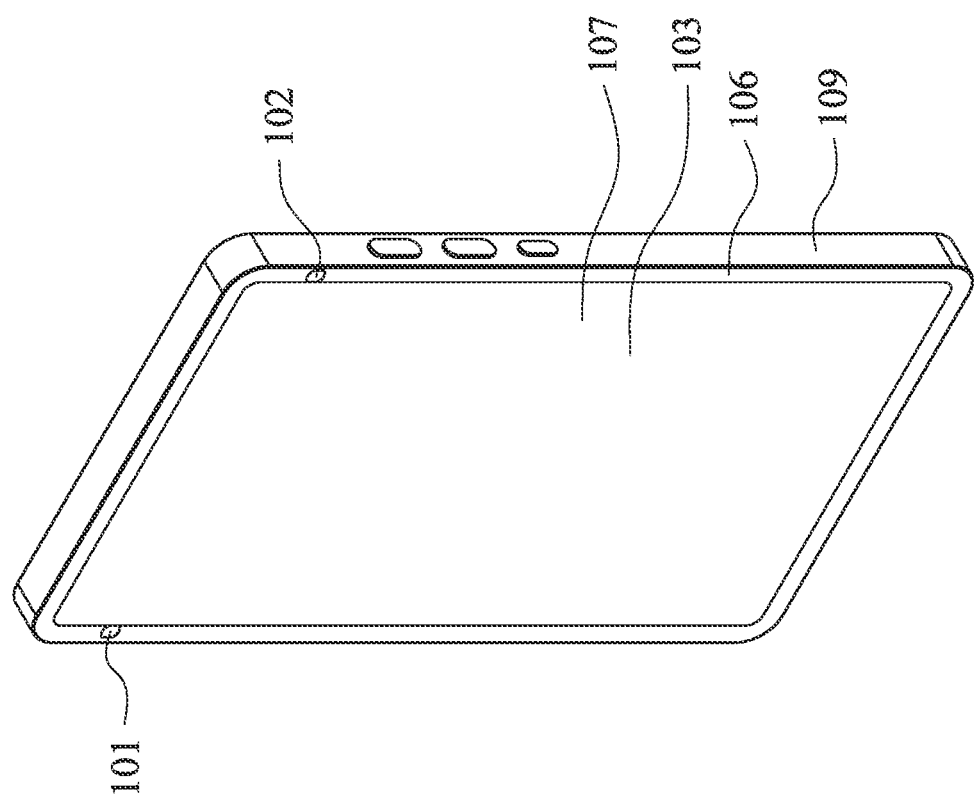
FIG. 1A is a three-dimensional view of an electronic device according to the 1st embodiment of the present disclosure.

According to the present disclosure, an electronic device is provided and includes a display screen, a first aperture region and a second aperture region (i.e., double aperture regions). The display screen is disposed on a surface of the electronic device. The first aperture region is disposed on the surface of the electronic device, and a visible light is able to enter into an internal portion of the electronic device through the first aperture region. The second aperture region is disposed on the surface of the electronic device, and the visible light is able to enter into the internal portion of the electronic device through the second aperture region. Specifically, the aforementioned surface of the electronic device may be a flat surface with the same normal direction thereon and substantially without curving on the electronic device, and the display screen may be in a rectangular shape, a circle shape, any symmetrical shape or any asymmetrical shape. Each of the first aperture region and the second aperture region may be an opening on the surface of the electronic device, or a surface portion made of a material (e.g., glass, plastic, etc.) featured with being transparent to the visible light.

Further, the display screen may be disposed between the first aperture region and the second aperture region and configured to be a spacing (i.e., a specific distance or gap) maintained therebetween, and a shape of the first aperture region and a shape of the second aperture region are non-circular and mirror-symmetrical to each other. When the spacing between the first aperture region and the second aperture region is dAB, a shortest straight-line (i.e., linear-line) distance defined by (i.e., defined according to) the display screen is dmin, and a longest straight-line distance defined by the display screen is dmax, the following conditions may be satisfied: $0.84 \times dmin < dAB < 1.31 \times dmax$; and $0.47 \times dmax < dmin < dmax$. Therefore, framing conditions are configured with specific geometric positions, so that the two framing positions are related. It is favorable for synchronously imaging with the image data of the two separate images, improving the optical specifications of two imaging lens assemblies respectively corresponding to the two aperture regions resulted from reducing the imaging format constraints, and further improving the merged picture's quality. Furthermore, it is also convenient to use the digital processing method to merge the image data of the two capturing frames into a single display frame, so that the merged image frame is featured with high consistency and high image quality. In addition, satisfying the aforementioned conditions is advantageous in maximizing the display screen of the electronic device or the wearable device, and effectively simultaneously improving the image quality and the photographing experience of using the electronic device or the wearable device.

The electronic device may further include a first imaging lens assembly and a second imaging lens assembly. The first imaging lens assembly is located in the internal portion of the electronic device and faces the first aperture region. The second imaging lens assembly is located in the internal portion of the electronic device and faces the second aperture region. The display screen is disposed between the first imaging lens assembly and the second imaging lens assembly and configured to be a spacing maintained therebetween. When the spacing between the first imaging lens assembly and the second imaging lens assembly is d'AB, the shortest straight-line distance defined by the display screen is dmin, and the longest straight-line distance defined by the display screen is dmax, the following conditions may be satisfied: $0.84 \times dmin < d'AB < 1.26 \times dmax$, and $0.47 \times dmax < dmin < dmax$. In addition, a shape of a first opening of the first imaging lens assembly and a shape of a second opening of the second imaging lens assembly may be non-circular and mirror-symmetrical to each other. Therefore, using the aforementioned photographic structure with a specific geometric space configuration is favorable for increasing the physical size of the display screen to the maximum, obtaining a larger frame to display the fine imaging details of the aforementioned photographic structure, so as to achieve dual advantageous feedback of the image quality and the industrial design of the body of the electronic device.

Moreover, the following condition may be satisfied: $0.83 \times dmin < d'AB < 1.29 \times dmax$. Therefore, it is favorable for obtaining more consistent framing conditions of the two imaging lens assemblies and maximizing the display screen. Further, the following condition may be satisfied: $0.83 \times dmin < d'AB < 1.26 \times dmax$.

According to the electronic device of the present disclosure, when a focal length of the first imaging lens assembly is efl1, and a focal length of the second imaging lens assembly is efl2, the following conditions may be satisfied: $2.0 \text{ mm} \leq efl1 \leq 4.2 \text{ mm}$; $2.0 \text{ mm} \leq efl2 \leq 4.2 \text{ mm}$; and $0.8 < efl1/efl2 < 1.25$. Therefore, it is beneficial to apply the framing structure with the widest range of photographic functions on the electronic device, so as to maximize the optical specifications of the photographic function and provide multiple rich configurations of the industrial design results for the electronic device itself. Further, it is favorable for maintaining a specific shooting framing range, which has rich practical application levels and is optimized for most real-shot images captured by the electronic devices or the wearable devices.

In detail, the first imaging lens assembly may be located in the internal portion of the electronic device and face the first aperture region, and the visible light passing through the first aperture region is able to enter into the first imaging lens assembly. Therefore, it is beneficial to avoid increasing the unnecessary volume outside the display screen of the electronic device such as a mobile phone.

The second imaging lens assembly may be located in the internal portion of the electronic device and face the second aperture region, and the visible light passing through the second aperture region is able to enter into the second imaging lens assembly. Therefore, it is advantageous in maintaining the configuration of the geometric relationship between the two imaging lens assemblies, and avoiding the unnecessary volume outside the display screen of the mobile phone. The framing condition of the two imaging lens assemblies can satisfy higher optical specifications, so as to be beneficial for subsequent image processing.

A first optical axis of the first imaging lens assembly and a second optical axis of the second imaging lens assembly may be substantially parallel to each other. Therefore, the higher the parallelism between the first optical axis and the second optical axis, the higher the consistency and coherence of the subsequently merged images will be, and thereby it is favorable for making full use of the real shooting level after the improvement of the optical specifications. Specifically, "substantially parallel to each other" may mean that an inclined angle between the first optical axis and the second optical axis is smaller than or equal to 4 degrees.

The first imaging lens assembly may include a first image sensor disposed on an image surface of the first imaging lens assembly, and a first imaging area of the first image sensor is corresponding to the image surface. A geometric center of the first imaging area and the first optical axis of the first imaging lens assembly are misaligned. When a first misalignment distance defined therebetween is dF1, and a maximum image height of the first imaging lens assembly is 1.0F1, the following condition may be satisfied: $0 \leq dF1 < (1.0F1) \times 1.1$. Therefore, the optical axis of the imaging lens assembly and the geometric center of the imaging area being misaligned is favorable for eliminating the redundant and unused imaging area, and minimizing the overall space of the imaging lens assembly and the imaging module thereof. Furthermore, the following condition may be satisfied: $(1.0F1) \times 0.08 \leq dF1 < (1.0F1) \times 1.05$.

The second imaging lens assembly may include a second image sensor disposed on an image surface of the second imaging lens assembly, and a second imaging area of the second image sensor is corresponding to the image surface. A geometric center of the second imaging area and the second optical axis of the second imaging lens assembly are misaligned. When a second misalignment distance defined therebetween is dF2, and a maximum image height of the second imaging lens assembly is 1.0F2, the following condition may be satisfied: $0 \leq dF2 < (1.0F2) \times 1.1$. Therefore, minimizing a thickness of a screen frame of the electronic device or the wearable device is favorable for achieving a proper interior mechanical configuration of the high-spec imaging lens assembly and the display screen. Further, the following condition may be satisfied: $(1.0F2) \times 0.08 \leq dF2 < (1.0F2) \times 1.05$.

When a pixel size of the first image sensor is P1, the following condition may be satisfied: $0.1 \text{ μm} < P1 < 0.95 \text{ μm}$. Therefore, providing a finer pixel size is favorable for simultaneously refining the image information and reducing the physical size of the image sensor. Furthermore, the following condition may be satisfied: $0.1 \text{ μm} < P1 < 0.83 \text{ μm}$. Therefore, it is favorable for further increasing the sharpness and color richness of the display image.

When a pixel size of the second image sensor is P2, the following condition may be satisfied: $0.1 \text{ μm} < P2 < 0.95 \text{ μm}$. Therefore, providing a finer pixel size is favorable for simultaneously refining the image information and reducing the physical size of the image sensor. Furthermore, the following condition may be satisfied: $0.1 \text{ μm} < P2 < 0.83 \text{ μm}$. Therefore, it is favorable for further increasing the sharpness and color richness of the display image. In addition, the structures and the optical properties of the corresponding elements of the first imaging lens assembly and the second imaging lens assembly may be mirror-symmetrical to each other, not mirror-symmetrical to each other, the same or different.

It should be noted that one of the first image sensor and the second image sensor may be a monochromatic imaging chip or a color imaging chip. In addition, both the first image sensor and the second image sensor may be the color imaging chips, but the present disclosure is not limited thereto.

A non-circular area of the first aperture region may be shrunk from a circular area corresponding to a maximum radius defined by the first aperture region. When the non-circular area of the first aperture region is A', and the circular area corresponding to the maximum radius defined by the first aperture region is A, the following condition may be satisfied: $0.2 \times A \leq A' < 1.03 \times A$. Therefore, partially reducing the area of aperture region being for light passing is favorable for being shrunk to a most suitable region, and maintaining the high optical specifications and the largest display screen, while maintaining the higher specification of imaging lens assembly.

A non-circular area of the shape of the second opening may be shrunk from a circular area corresponding to a maximum radius defined by the shape of the second opening. When the non-circular area of the shape of the second opening is b', and the circular area corresponding to the maximum radius defined by the shape of the second opening is b, the following condition may be satisfied: $0.2 \times b \leq b' < 1.03 \times b$. Therefore, the miniaturized imaging lens assembly is advantageous in implementing a higher optical specification and a higher occupying ratio of the display screen.

Each of the aforementioned features of the electronic device can be utilized in various combinations for achieving the corresponding effects. According to the aforementioned aspects, specific embodiments are provided, and illustrated via figures.

1st Embodiment

Figure 1B:
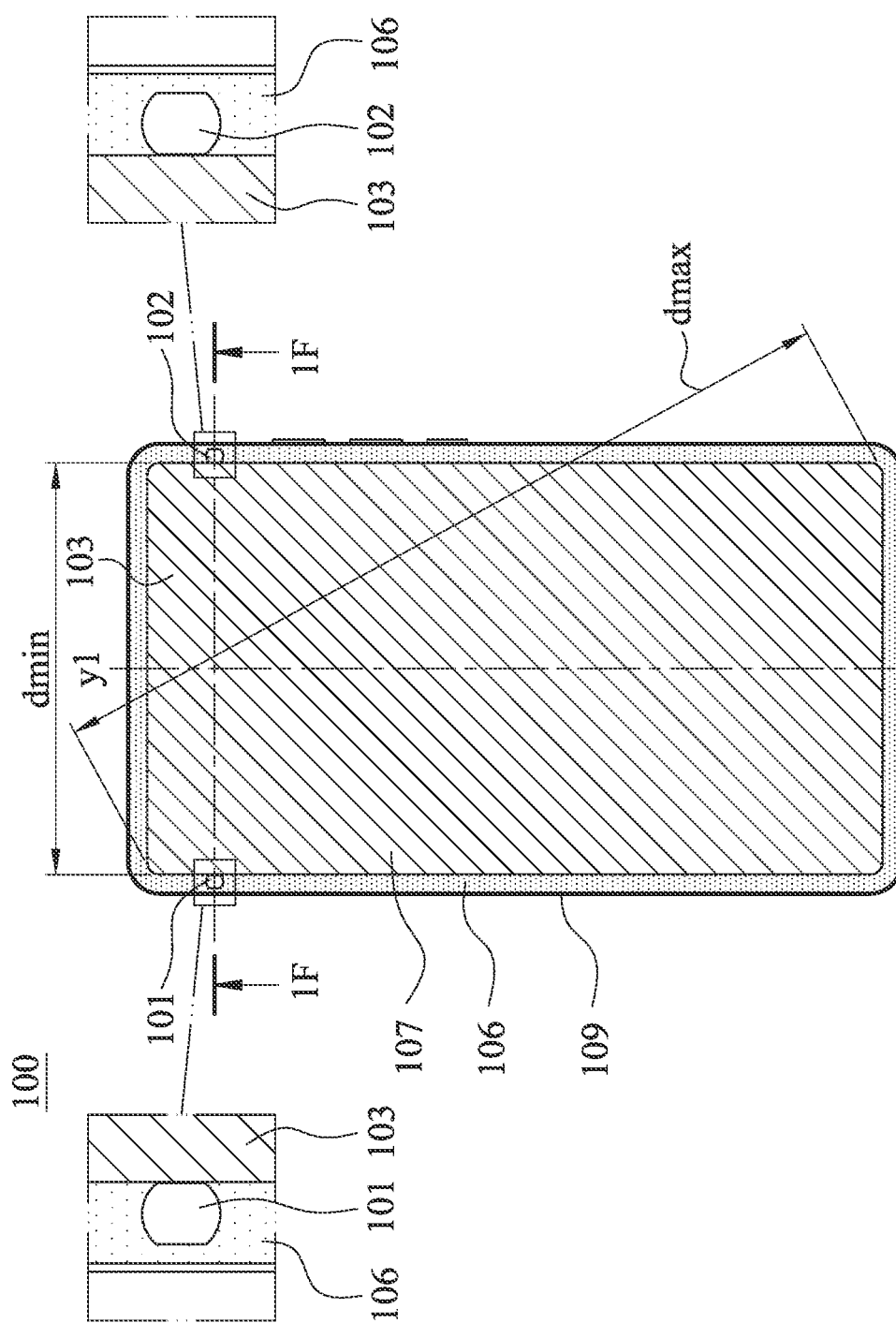
FIG. 1B is a front view of the electronic device in FIG. 1A according to the 1st embodiment.
Figure 1C:
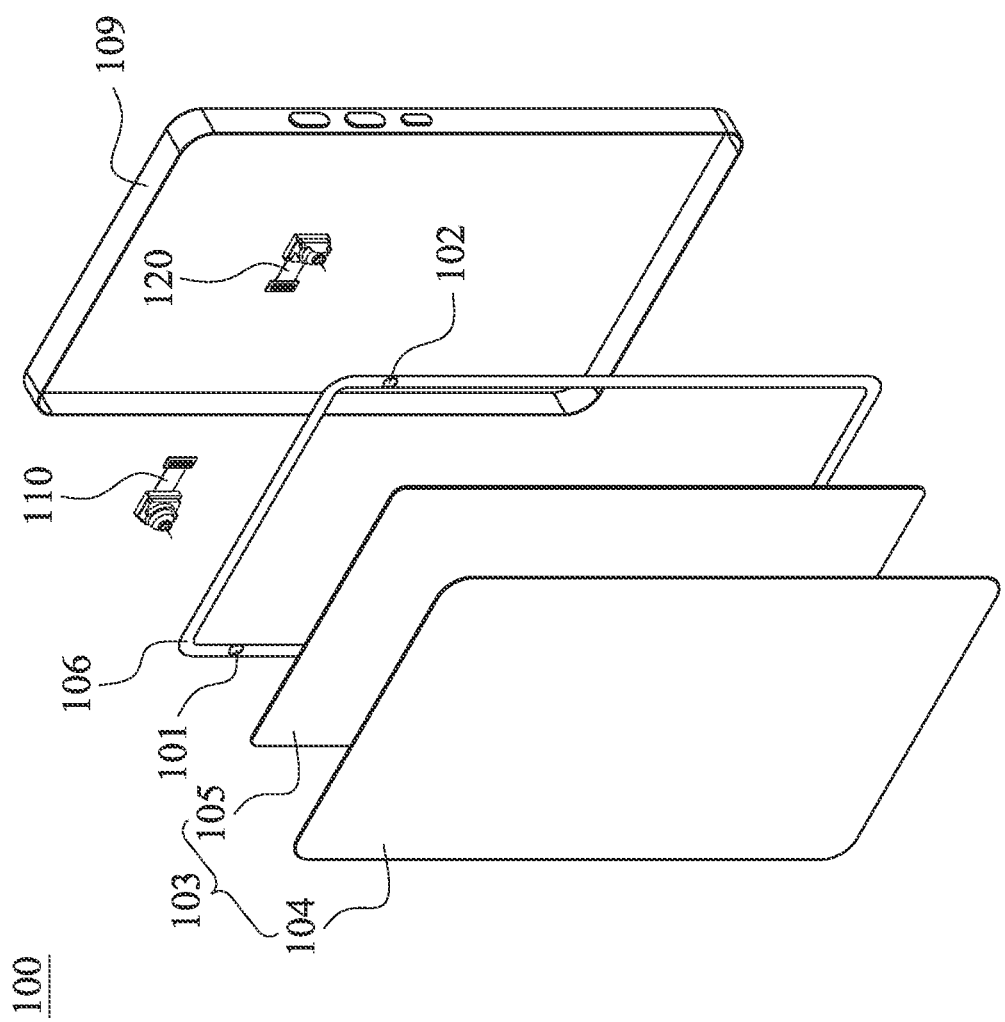
FIG. 1C is an exploded view of the electronic device in FIG. 1A according to the 1st embodiment.

FIG. 1A is a three-dimensional view of an electronic device 100 according to the 1st embodiment of the present disclosure, FIG. 1B is a front view of the electronic device 100 in FIG. 1A according to the 1st embodiment, and FIG. 1C is an exploded view of the electronic device 100 in FIG. 1A according to the 1st embodiment (partial elements located in an internal portion of the electronic device 100 being omitted). With reference to FIG. 1A to FIG. 1C, the electronic device 100 includes a display screen 103, a first aperture region 101 and a second aperture region 102. The electronic device 100 is a smart phone. The display screen 103 is disposed and exposed on a surface 107 of the electronic device 100 and in a rectangular shape. The first aperture region 101 is disposed and exposed on the surface 107 of the electronic device 100, and a visible light is able to enter into the internal portion of the electronic device 100 through the first aperture region 101. The second aperture region 102 is disposed and exposed on the surface 107 of the electronic device 100, and the visible light is able to enter into the internal portion of the electronic device 100 through the second aperture region 102.

FIG. 1D is a schematic view of parameters of the electronic device 100 in FIG. 1A according to the 1st embodiment, and FIG. 1E is a schematic view of the first aperture region 101 of the electronic device 100 according to the 1st embodiment. With reference to FIG. 1B, FIG. 1D and FIG. 1E, the display screen 103 is disposed between the first aperture region 101 and the second aperture region 102 and configured to be a spacing dAB maintained therebetween, and a shape of the first aperture region 101 and a shape of the second aperture region 102 are non-circular (as shown in FIG. 1B and FIG. 1D) and mirror-symmetrical to each other with respect to a reference plane y1 being virtual shown in FIG. 1B.

With reference to FIG. 1A to FIG. 1C, specifically, the display screen 103 and a screen frame 106 are exposed on and form the surface 107 of the electronic device 100. The display screen 103 includes a touch panel 104 and a display layer 105 in order from the surface 107 to the internal portion of the electronic device 100. The screen frame 106 surrounds the display screen 103 and is connected to a housing 109. The first aperture region 101 and the second aperture region 102 are disposed on the screen frame 106.

Figure 1F:
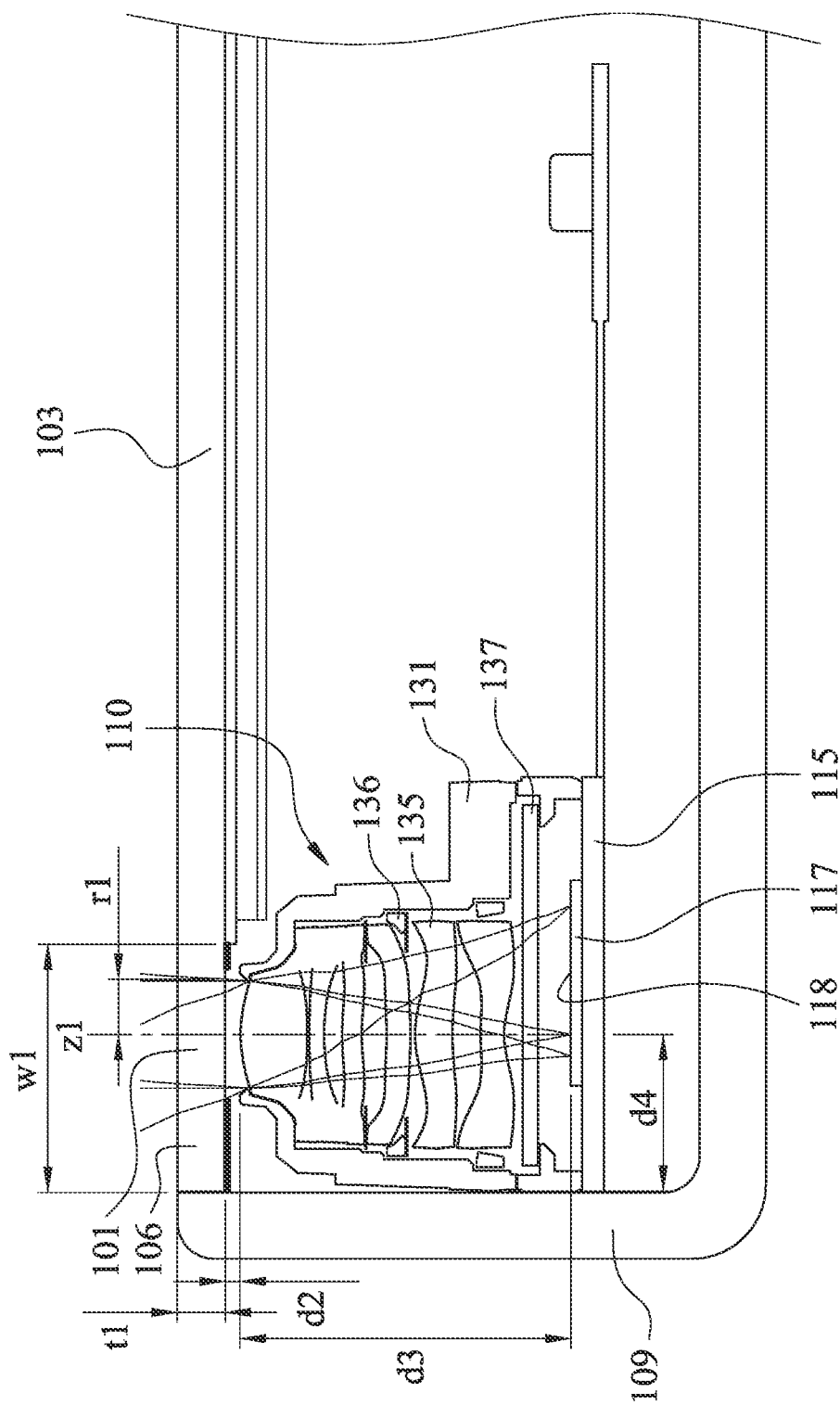
FIG. 1F is a cross-sectional view along line 1F-1F in FIG. 1B.
Figure 1G:
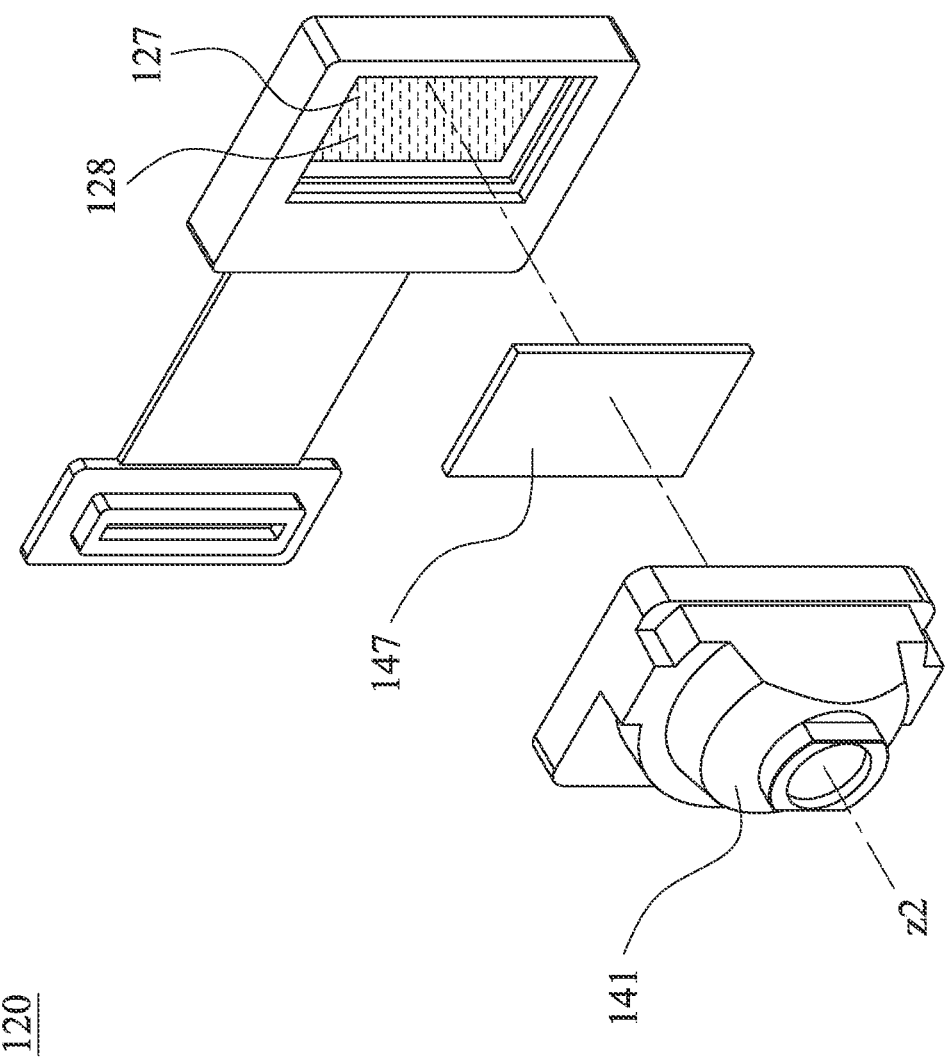
FIG. 1G is an exploded view of a second imaging lens assembly of the electronic device according to the 1st embodiment.

FIG. 1F is a cross-sectional view along line 1F-1F in FIG. 1B, and FIG. 1F is also a schematic view illustrating that the visible light enters into the internal portion of the electronic device 100 through the first aperture region 101. FIG. 1G is an exploded view of a second imaging lens assembly 120 of the electronic device 100 according to the 1st embodiment. With reference to FIG. 1B to FIG. 1G, the electronic device 100 further includes a first imaging lens assembly 110 and the second imaging lens assembly 120. The first imaging lens assembly 110 is located in the internal portion of the electronic device 100 and faces the first aperture region 101, and the visible light passing through the first aperture region 101 is able to enter into the first imaging lens assembly 110. The second imaging lens assembly 120 is located in the internal portion of the electronic device 100 and faces the second aperture region 102, and the visible light passing through the second aperture region 102 is able to enter into the second imaging lens assembly 120. The display screen 103 is disposed between the first imaging lens assembly 110 and the second imaging lens assembly 120 and configured to be a spacing d'AB maintained therebetween. In addition, a shape of a first opening (i.e., a first light entrance opening) 116 of the first imaging lens assembly 110 and a shape of a second opening (i.e., a second light entrance opening) 126 of the second imaging lens assembly 120 are circular (as shown in FIG. 1D) and mirror-symmetrical to each other with respect to the reference plane y1. The first opening 116 is defined by a lens barrel 131, and the second opening 126 is defined by a lens barrel 141. A boundary of the first aperture region 101 correspondingly surrounds a boundary of the first opening 116, and a boundary of the second aperture region 102 correspondingly surrounds a boundary of the second opening 126, as shown in FIG. 1D.

In detail, with reference to FIG. 1E, a non-circular area A' of the first aperture region 101 is shrunk from an area A of a circle 101c corresponding to a maximum radius RA defined by the first aperture region 101. Specifically, the circle 101c with two ends, which are respectively close to and far from the reference plane y1 in FIG. 1B, being shrunk forms a non-circular shape of the first aperture region 101, and shrunk areas (or removed areas) being close to and far from the reference plane y1 are equal. Furthermore, a first optical axis z1 of the first imaging lens assembly 110 and a second optical axis z2 of the second imaging lens assembly 120 are substantially parallel to each other.

With reference to FIG. 1D to FIG. 1G, the first imaging lens assembly 110 includes a first image sensor 117 disposed on an image surface of the first imaging lens assembly 110, and a first imaging area 118 of the first image sensor 117 is corresponding to (i.e., located on) the image surface. A geometric center 119 of the first imaging area 118 and the first optical axis z1 of the first imaging lens assembly 110 are misaligned, a first misalignment distance dF1 (as shown in FIG. 1D) can be defined therebetween, and the first optical axis z1 is located farther from the reference plane y1 in FIG. 1B than the geometric center 119 therefrom.

The second imaging lens assembly 120 includes a second image sensor 127 disposed on an image surface of the second imaging lens assembly 120, and a second imaging area 128 of the second image sensor 127 is corresponding to the image surface. A geometric center 129 of the second imaging area 128 and the second optical axis z2 of the second imaging lens assembly 120 are misaligned, a second misalignment distance dF2 (as shown in FIG. 1D) can be defined therebetween, and the second optical axis z2 is located farther from the reference plane y1 in FIG. 1B than the geometric center 129 therefrom.

With reference to FIG. 1F and FIG. 1G, specifically, the first imaging lens assembly 110 includes an imaging module and the first image sensor 117, and the imaging module includes the lens barrel 131, a plurality of lens elements 135, a plurality of annular optical elements 136 and a filtering element 137. The second imaging lens assembly 120 includes an imaging module and the second image sensor 127, and the imaging module includes the lens barrel 141, a plurality of lens elements, a plurality of annular optical elements and a filtering element 147. Furthermore, the structures and the optical properties of the corresponding elements of the first imaging lens assembly 110 and the second imaging lens assembly 120 may be mirror-symmetrical with respect to the reference plane y1 shown in FIG. 1B.

Figure 1J:
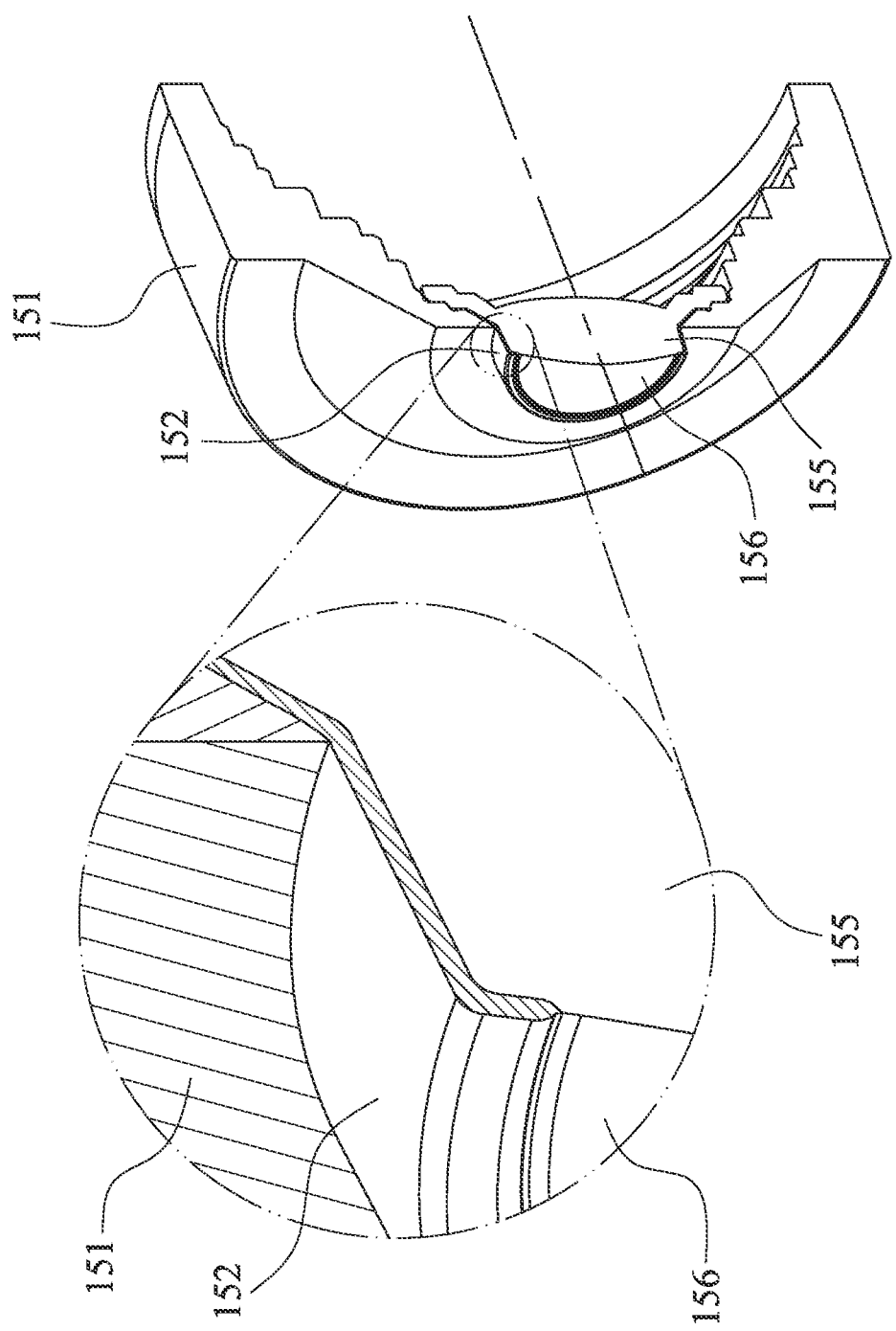
FIG. 1J is a partially three-dimensional view of the imaging lens assembly in FIG. 1H.

FIG. 1H is a partially schematic view of another imaging lens assembly being able to be configured in the electronic device 100 according to the 1st embodiment, FIG. 1I is a partially exploded view of the imaging lens assembly in FIG. 1H, and FIG. 1J is a partially three-dimensional view of the imaging lens assembly in FIG. 1H. With reference to FIG. 1H to FIG. 1J, each of a first imaging lens assembly and a second imaging lens assembly of each of the electronic device 100 and an electronic device of other embodiment according to the present disclosure may be the imaging lens assembly shown in FIG. 1H. An imaging module of the imaging lens assembly in FIG. 1H includes a lens barrel 151, a light absorbing layer 152, a plurality of lens elements 155 and a plurality of annular optical elements, and materials of the lens barrel 151, the light absorbing layer 152 and the annular optical elements are opaque to the visible light. One of the lens elements 155 closest to an object side includes an optical effective surface 156 and an outer peripheral surface 157. The light absorbing layer 152 is coated between the lens barrel 151 and the outer peripheral surface 157, and extends toward the object side along the outer peripheral surface 157 and slightly extends toward the optical axis to define the optical effective surface 156, so that a light entrance opening of the imaging lens assembly shown in FIG. 1H can be defined by the light absorbing layer 152. Thus, a light entrance opening of an imaging lens assembly of the present disclosure can be determined by an opening diameter of a lens barrel, and can also be determined by a light absorbing layer or an annular optical element, but is not limited thereto. In other words, an optical specification of an imaging lens assembly may be directly related to a shape and a size of an opening of a light absorbing layer.

With reference to FIG. 1B, FIG. 1D and FIG. 1F, the spacing between the first aperture region 101 and the second aperture region 102 is dAB, the spacing between the first imaging lens assembly 110 and the second imaging lens assembly 120 is d'AB, a longest straight-line distance defined by the display screen 103 is dmax, a shortest straight-line distance defined by the display screen 103 is dmin, a maximum image height of the first imaging lens assembly 110 is 1.0F1, and a maximum image height of the second imaging lens assembly 120 is 1.0F2. The geometric center 119 of the first imaging area 118 and the first optical axis z1 of the first imaging lens assembly 110 are misaligned, and the first misalignment distance defined therebetween is dF1. The geometric center 129 of the second imaging area 128 and the second optical axis z2 of the second imaging lens assembly 120 are misaligned, and the second misalignment distance defined therebetween is dF2. A pixel size of the first image sensor 117 is P1, a pixel size of the second image sensor 127 is P2, a focal length of the first imaging lens assembly 110 is efl1, and a focal length of the second imaging lens assembly 120 is efl2. The area of the circle 101c corresponding to the maximum radius RA defined by the first aperture region 101 is A, and the non-circular area of the first aperture region 101 is A'. A radius of the first opening 116 is r1, a width of the screen frame 106 is w1, a thickness of the screen frame 106 is t1, a distance between the screen frame 106 and the first imaging lens assembly 110 is d2, a distance between a position closest to the object side of the first imaging lens assembly 110 and the first imaging area 118 is d3, and a distance between the first optical axis z1 and a position closest to the housing 109 of a circuit board 115, on which the first image sensor 117 is disposed, is d4. The data of the aforementioned parameters of the electronic device 100 according to the 1st embodiment are listed in the following Table 1.

TABLE 1

| 1st Embodiment | |
|---|---|
| dAB (mm) | 68.50 |
| d'AB (mm) | 68.84 |
| dmax (mm) | 139.7 |
| dmin (mm) | 68.40 |
| 1.0F1 (mm) | 2.934 |
| 1.0F2 (mm) | 2.934 |
| dF1 (mm) | 0.734 |
| dF2 (mm) | 0.734 |
| P1 (um) | 0.8 |
| P2 (um) | 0.8 |
| efl1 (mm) | 3.58 |
| efl2 (mm) | 3.58 |
| efl1/efl2 | 1 |
| A' (mm$^2$) | 3.664 |
| A (mm$^2$) | 3.373 |
| r1 (mm) | 0.75 |
| w1 (mm) | 3.38 |
| t1 (mm) | 0.65 |
| d2 (mm) | 0.2 |
| d3 (mm) | 4.5 |
| d4 (mm) | 2.13 |

2nd Embodiment

Figure 2A:
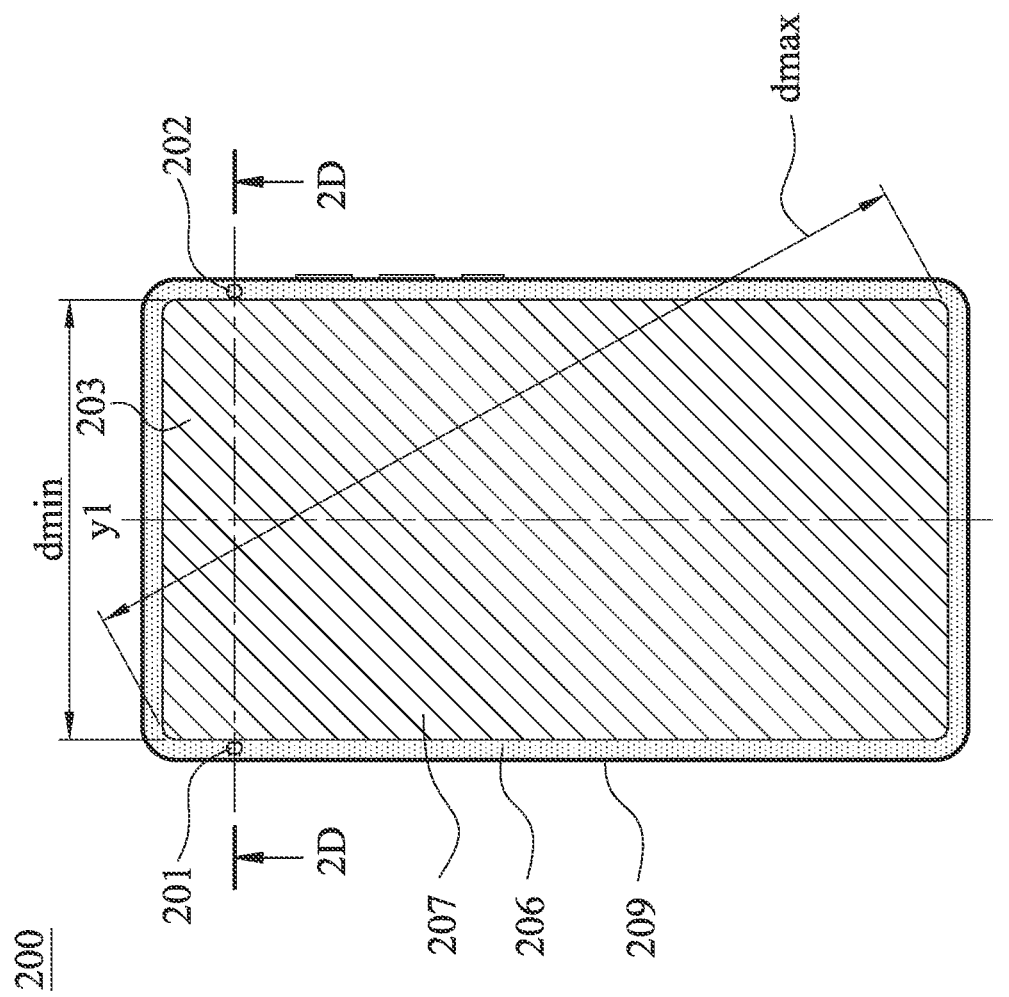
FIG. 2A is a front view of an electronic device according to the 2nd embodiment of the present disclosure.

FIG. 2A is a front view of an electronic device 200 according to the 2nd embodiment of the present disclosure. With reference to FIG. 2A, the electronic device 200 includes a display screen 203, a first aperture region 201 and a second aperture region 202. The electronic device 200 is a smart phone. The display screen 203 is disposed and exposed on a surface 207 of the electronic device 200 and in a rectangular shape. The first aperture region 201 is disposed and exposed on the surface 207 of the electronic device 200, and a visible light is able to enter into the internal portion of the electronic device 200 through the first aperture region 201. The second aperture region 202 is disposed and exposed on the surface 207 of the electronic device 200, and the visible light is able to enter into the internal portion of the electronic device 200 through the second aperture region 202.

FIG. 2B is a schematic view of parameters of the electronic device 200 in FIG. 2A according to the 2nd embodiment, and FIG. 2C is a schematic view of the first aperture region 201 of the electronic device 200 according to the 2nd embodiment. With reference to FIG. 2A to FIG. 2C, the display screen 203 is disposed between the first aperture region 201 and the second aperture region 202 and configured to be a spacing dAB maintained therebetween, and a shape of the first aperture region 201 and a shape of the second aperture region 202 are non-circular (as shown in FIG. 2B) and mirror-symmetrical to each other with respect to a reference plane y1 being virtual.

With reference to FIG. 2A, specifically, the display screen 203 and a screen frame 206 are exposed on and form the surface 207 of the electronic device 200. The screen frame 206 surrounds the display screen 203 and is connected to a housing 209. The first aperture region 201 and the second aperture region 202 are disposed on the screen frame 206.

Figure 2D:
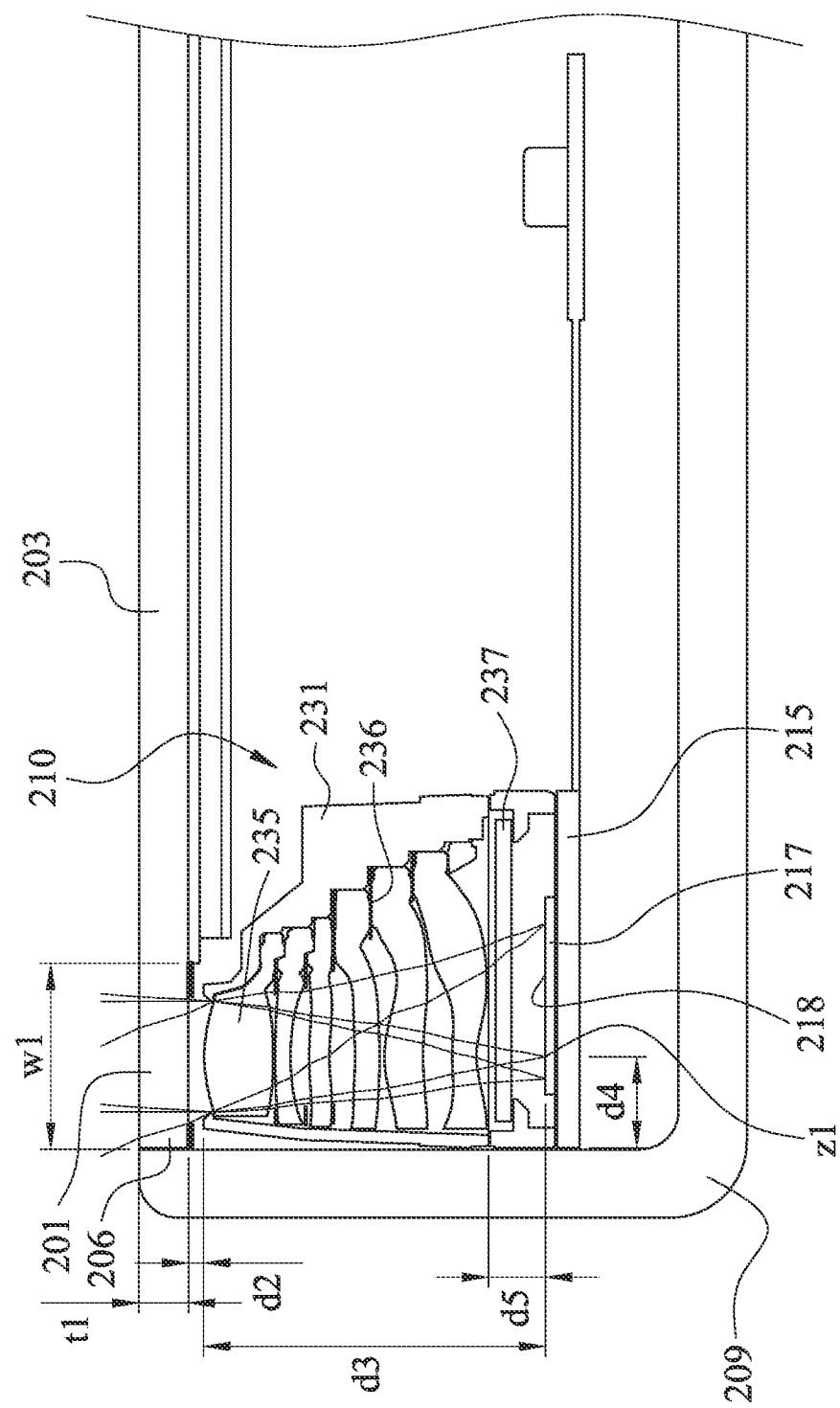
FIG. 2D is a cross-sectional view along line 2D-2D in FIG. 2A.

FIG. 2D is a cross-sectional view along line 2D-2D in FIG. 2A, and FIG. 2D is also a schematic view illustrating that the visible light enters into the internal portion of the electronic device 200 through the first aperture region 201. With reference to FIG. 2A to FIG. 2D, the electronic device 200 further includes a first imaging lens assembly 210 and a second imaging lens assembly. The first imaging lens assembly 210 is located in the internal portion of the electronic device 200 and faces the first aperture region 201, and the visible light passing through the first aperture region 201 is able to enter into the first imaging lens assembly 210. The second imaging lens assembly is located in the internal portion of the electronic device 200 and faces the second aperture region 202, and the visible light passing through the second aperture region 202 is able to enter into the second imaging lens assembly. The display screen 203 is disposed between the first imaging lens assembly 210 and the second imaging lens assembly and configured to be a spacing d'AB maintained therebetween. In addition, a shape of a first opening 216 of the first imaging lens assembly 210 and a shape of a second opening 226 of the second imaging lens assembly are circular (as shown in FIG. 2B) and mirror-symmetrical to each other with respect to the reference plane y1. The first opening 216 is defined by a lens barrel 231, and the second opening 226 is defined by a lens barrel of the second imaging lens assembly. A boundary of the first aperture region 201 correspondingly surrounds a boundary of the first opening 216, and a boundary of the second aperture region 202 correspondingly surrounds a boundary of the second opening 226, as shown in FIG. 2D.

In detail, with reference to FIG. 2C, a non-circular area A' of the first aperture region 201 is shrunk from an area A of a circle 201c corresponding to a maximum radius RA defined by the first aperture region 201. Specifically, the circle 201c with two ends, which are respectively close to and far from the reference plane y1 in FIG. 2A, being shrunk forms a non-circular shape of the first aperture region 201, and a removed area close to the reference plane y1 is more than a removed area far from the reference plane y1. Furthermore, a first optical axis z1 of the first imaging lens assembly 210 and a second optical axis z2 of the second imaging lens assembly are substantially parallel to each other.

With reference to FIG. 2B to FIG. 2D, the first imaging lens assembly 210 includes a first image sensor 217 disposed on an image surface of the first imaging lens assembly 210, and a first imaging area 218 of the first image sensor 217 is corresponding to the image surface. A geometric center 219 of the first imaging area 218 and the first optical axis z1 of the first imaging lens assembly 210 are misaligned, a first misalignment distance dF1 (as shown in FIG. 2B) can be defined therebetween, and the first optical axis z1 is located farther from the reference plane y1 in FIG. 2A than the geometric center 219 therefrom.

The second imaging lens assembly includes a second image sensor disposed on an image surface of the second imaging lens assembly, and a second imaging area 228 of the second image sensor is corresponding to the image surface. A geometric center 229 of the second imaging area 228 and the second optical axis z2 of the second imaging lens assembly are misaligned, a second misalignment distance dF2 (as shown in FIG. 2B) can be defined therebetween, and the second optical axis z2 is located farther from the reference plane y1 in FIG. 2A than the geometric center 229 therefrom.

With reference to FIG. 2D, specifically, the first imaging lens assembly 210 includes an imaging module and the first image sensor 217, and the imaging module includes the lens barrel 231, a plurality of lens elements 235, a plurality of annular optical elements 236 and a filtering element 237. The second imaging lens assembly includes an imaging module and the second image sensor, and the imaging module includes the lens barrel, a plurality of lens elements, a plurality of annular optical elements and a filtering element. Furthermore, the structures and the optical properties of the corresponding elements of the first imaging lens assembly 210 and the second imaging lens assembly may be mirror-symmetrical with respect to the reference plane y1 shown in FIG. 2A.

With reference to FIG. 2A, FIG. 2B and FIG. 2D, the spacing between the first aperture region 201 and the second aperture region 202 is dAB, the spacing between the first imaging lens assembly 210 and the second imaging lens assembly is d'AB, a longest straight-line distance defined by the display screen 203 is dmax, a shortest straight-line distance defined by the display screen 203 is dmin, a maximum image height of the first imaging lens assembly 210 is 1.0F1, and a maximum image height of the second imaging lens assembly is 1.0F2. The geometric center 219 of the first imaging area 218 and the first optical axis z1 of the first imaging lens assembly 210 are misaligned, and the first misalignment distance defined therebetween is dF1. The geometric center 229 of the second imaging area 228 and the second optical axis z2 of the second imaging lens assembly are misaligned, and the second misalignment distance defined therebetween is dF2. A pixel size of the first image sensor 217 is P1, a pixel size of the second image sensor 227 is P2, a focal length of the first imaging lens assembly 210 is efl1, and a focal length of the second imaging lens assembly is efl2. The area of the circle 201c corresponding to the maximum radius RA defined by the first aperture region 201 is A, and the non-circular area of the first aperture region 201 is A'. A width of the screen frame 206 is w1, a thickness of the screen frame 206 is t1, a distance between the screen frame 206 and the first imaging lens assembly 210 is d2, a distance between a position closest to the object side of the first imaging lens assembly 210 and the first imaging area 218 is d3, a distance between the first optical axis z1 and a position closest to the housing 209 of a circuit board 215, on which the first image sensor 217 is disposed, is d4, and a distance between the lens barrel 231 and first imaging area 218 is d5. The data of the aforementioned parameters of the electronic device 200 according to the 2nd embodiment are listed in the following Table 2.

TABLE 2

| 2nd Embodiment | |
|---|---|
| dAB (mm) | 76.06 |
| d'AB (mm) | 76.20 |
| dmax (mm) | 154.9 |
| dmin (mm) | 75.96 |
| 1.0F1 (mm) | 2.934 |
| 1.0F2 (mm) | 2.934 |
| dF1 (mm) | 0.734 |
| dF2 (mm) | 0.734 |

TABLE 2-continued

2nd Embodiment

| | |
|---|---|
| P1 (um) | 0.8 |
| P2 (um) | 0.8 |
| efl1 (mm) | 3.58 |
| efl2 (mm) | 3.58 |
| efl1/efl2 | 1 |
| A (mm$^2$) | 3.664 |
| A' (mm$^2$) | 3.219 |
| w1 (mm) | 2.45 |
| t1 (mm) | 0.65 |
| d2 (mm) | 0.2 |
| d3 (mm) | 4.5 |
| d4 (mm) | 1.2 |
| d5 (mm) | 0.75 |

3rd Embodiment

Figure 3A:
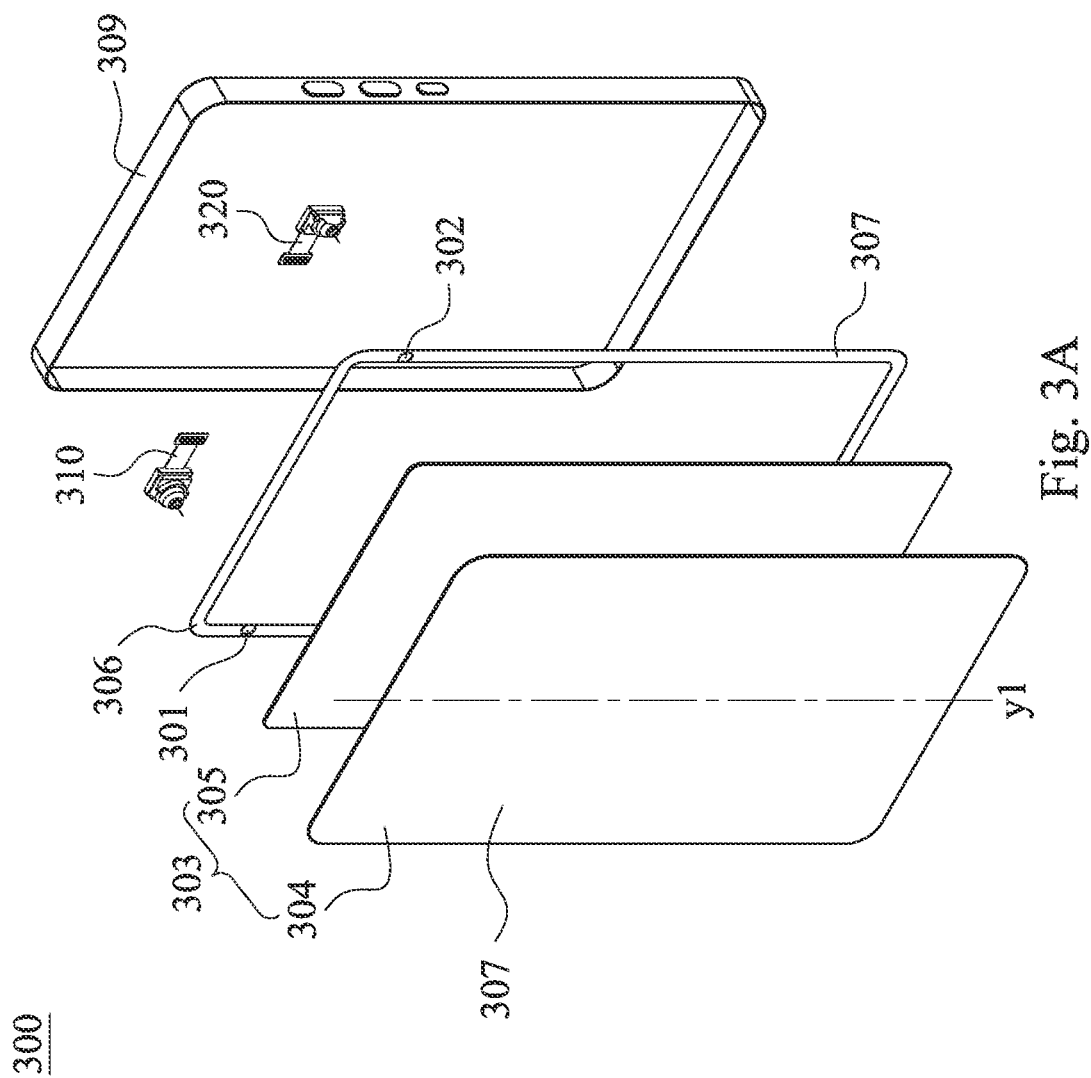
FIG. 3A is an exploded view of an electronic device according to the 3rd embodiment of the present disclosure.

FIG. 3A is an exploded view of an electronic device 300 according to the 3rd embodiment of the present disclosure. With reference to FIG. 3A, the electronic device 300 includes a display screen 303, a first aperture region 301 and a second aperture region 302. The electronic device 300 is a smart phone. The display screen 303 is disposed and exposed on a surface 307 of the electronic device 300 and in a rectangular shape. The first aperture region 301 is disposed and exposed on the surface 307 of the electronic device 300, and a visible light is able to enter into the internal portion of the electronic device 300 through the first aperture region 301. The second aperture region 302 is disposed and exposed on the surface 307 of the electronic device 300, and the visible light is able to enter into the internal portion of the electronic device 300 through the second aperture region 302.

FIG. 3B is a schematic view of parameters of the electronic device 300 in FIG. 3A according to the 3rd embodiment and FIG. 3C is a schematic view of the first aperture region 301 of the electronic device 300 according to the 3rd embodiment. With reference to FIG. 3A to FIG. 3C, the display screen 303 is disposed between the first aperture region 301 and the second aperture region 302 and configured to be a spacing dAB maintained therebetween, and a shape of the first aperture region 301 and a shape of the second aperture region 302 are non-circular (as shown in FIG. 3B) and mirror-symmetrical to each other with respect to a reference plane y1 being virtual.

With reference to FIG. 3A, specifically, the display screen 303 and a screen frame 306 are exposed on and form the surface 307 of the electronic device 300. The display screen 303 includes a touch panel 304 and a display layer 305 in order from the surface 307 to the internal portion of the electronic device 300. The screen frame 306 surrounds the display screen 303 and is connected to a housing 309. The first aperture region 301 and the second aperture region 302 are disposed on the screen frame 306.

FIG. 3D is a schematic view of a second opening 326 of the electronic device 300 according to the 3rd embodiment, and FIG. 3E is an exploded view of a second imaging lens assembly 320 of the electronic device 300 according to the 3rd embodiment. With reference to FIG. 3A to FIG. 3E, the electronic device 300 further includes a first imaging lens assembly 310 and the second imaging lens assembly 320. The first imaging lens assembly 310 is located in the internal portion of the electronic device 300 and faces the first aperture region 301, and the visible light passing through the first aperture region 301 is able to enter into the first imaging lens assembly 310. The second imaging lens assembly 320 is located in the internal portion of the electronic device 300 and faces the second aperture region 302, and the visible light passing through the second aperture region 302 is able to enter into the second imaging lens assembly 320. The display screen 303 is disposed between the first imaging lens assembly 310 and the second imaging lens assembly 320 and configured to be a spacing d'AB maintained therebetween. In addition, a shape of a first opening 316 of the first imaging lens assembly 310 and a shape of the second opening 326 of the second imaging lens assembly 320 are non-circular (as shown in FIG. 3B) and mirror-symmetrical to each other with respect to the reference plane y1. A boundary of the first aperture region 301 correspondingly surrounds a boundary of the first opening 316, and a boundary of the second aperture region 302 correspondingly surrounds a boundary of the second opening 326, as shown in FIG. 3B.

In detail, with reference to FIG. 3C, a non-circular area A' of the first aperture region 301 is shrunk from an area A of a circle 301c corresponding to a maximum radius RA defined by the first aperture region 301. Specifically, the circle 301c with two ends, which are respectively close to and far from the reference plane y1 in FIG. 3A, being shrunk forms a non-circular shape of the first aperture region 301, and shrunk areas being close to and far from the reference plane y1 are equal.

With reference to FIG. 3D, a non-circular area b' of a shape of the second opening 326 is shrunk from an area b of a circle 326c corresponding to a maximum radius rb defined by the shape of the second opening 326. Specifically, the circle 326c with two ends, which are respectively close to and far from the reference plane y1 in FIG. 3A, being shrunk forms a non-circular shape of the second opening 326, and shrunk areas being close to and far from the reference plane y1 are equal. Furthermore, a first optical axis z1 of the first imaging lens assembly 310 and a second optical axis z2 of the second imaging lens assembly 320 are substantially parallel to each other.

With reference to FIG. 3B, the first imaging lens assembly 310 includes a first image sensor 317 disposed on an image surface of the first imaging lens assembly 310, and a first imaging area 318 of the first image sensor 317 is corresponding to the image surface. A geometric center 319 of the first imaging area 318 and the first optical axis z1 of the first imaging lens assembly 310 are misaligned, a first misalignment distance dF1 can be defined therebetween, and the first optical axis z1 is located farther from the reference plane y1 in FIG. 3A than the geometric center 319 therefrom.

The second imaging lens assembly 320 includes a second image sensor 327 disposed on an image surface of the second imaging lens assembly 320, and a second imaging area 328 of the second image sensor 327 is corresponding to the image surface. A geometric center 329 of the second imaging area 328 and the second optical axis z2 of the second imaging lens assembly 320 are misaligned, a second misalignment distance dF2 (as shown in FIG. 3B) can be defined therebetween, and the second optical axis z2 is located farther from the reference plane y1 in FIG. 3A than the geometric center 329 therefrom.

With reference to FIG. 3E, specifically, the first imaging lens assembly 310 includes an imaging module and the first image sensor, and the imaging module includes a lens barrel, a plurality of lens elements, a plurality of annular optical elements and a filtering element. The second imaging lens assembly 320 includes an imaging module and the second image sensor 327, and the imaging module includes the lens barrel 341, a plurality of lens elements, a plurality of annular optical elements and a filtering element 347. Furthermore, the structures and the optical properties of the corresponding elements of the first imaging lens assembly 310 and the second imaging lens assembly 320 may be mirror-symmetrical with respect to the reference plane y1 shown in FIG. 3A.

With reference to FIG. 3B, the spacing between the first aperture region 301 and the second aperture region 302 is dAB, the spacing between the first imaging lens assembly 310 and the second imaging lens assembly 320 is d'AB, a longest straight-line distance defined by the display screen 303 is dmax, a shortest straight-line distance defined by the display screen 303 is dmin, a maximum image height of the first imaging lens assembly 310 is 1.0F1, and a maximum image height of the second imaging lens assembly 320 is 1.0F2. The geometric center 319 of the first imaging area 318 and the first optical axis z1 of the first imaging lens assembly 310 are misaligned, and the first misalignment distance defined therebetween is dF1. The geometric center 329 of the second imaging area 328 and the second optical axis z2 of the second imaging lens assembly 320 are misaligned, and the second misalignment distance defined therebetween is dF2. A pixel size of the first image sensor 317 is P1, a pixel size of the second image sensor 327 is P2, a focal length of the first imaging lens assembly 310 is efl1, and a focal length of the second imaging lens assembly 320 is efl2. The area of the circle 301c corresponding to the maximum radius RA defined by the first aperture region 301 is A, and the non-circular area of the first aperture region 301 is A'. The area of the circle 326c corresponding to the maximum radius rb defined by the shape of the second opening 326 is b, and the non-circular area of the shape of the second opening 326 is b'. The data of the aforementioned parameters of the electronic device 300 according to the 3rd embodiment are listed in the following Table 3.

TABLE 3

3rd Embodiment

| | |
|---|---|
| dAB (mm) | 76.06 |
| d'AB (mm) | 76.60 |
| dmax (mm) | 154.9 |
| dmin (mm) | 75.96 |
| 1.0F1 (mm) | 2.934 |
| 1.0F2 (mm) | 2.934 |
| dF1 (mm) | 0.734 |
| dF2 (mm) | 0.734 |
| P1 (um) | 0.7 |
| P2 (um) | 0.7 |
| efl1 (mm) | 3.58 |
| efl2 (mm) | 3.58 |
| efl1/efl2 | 1 |
| A (mm$^2$) | 3.664 |
| A' (mm$^2$) | 3.373 |
| b (mm$^2$) | 1.674 |
| b' (mm$^2$) | 1.584 |

4th Embodiment

Figure 4A:
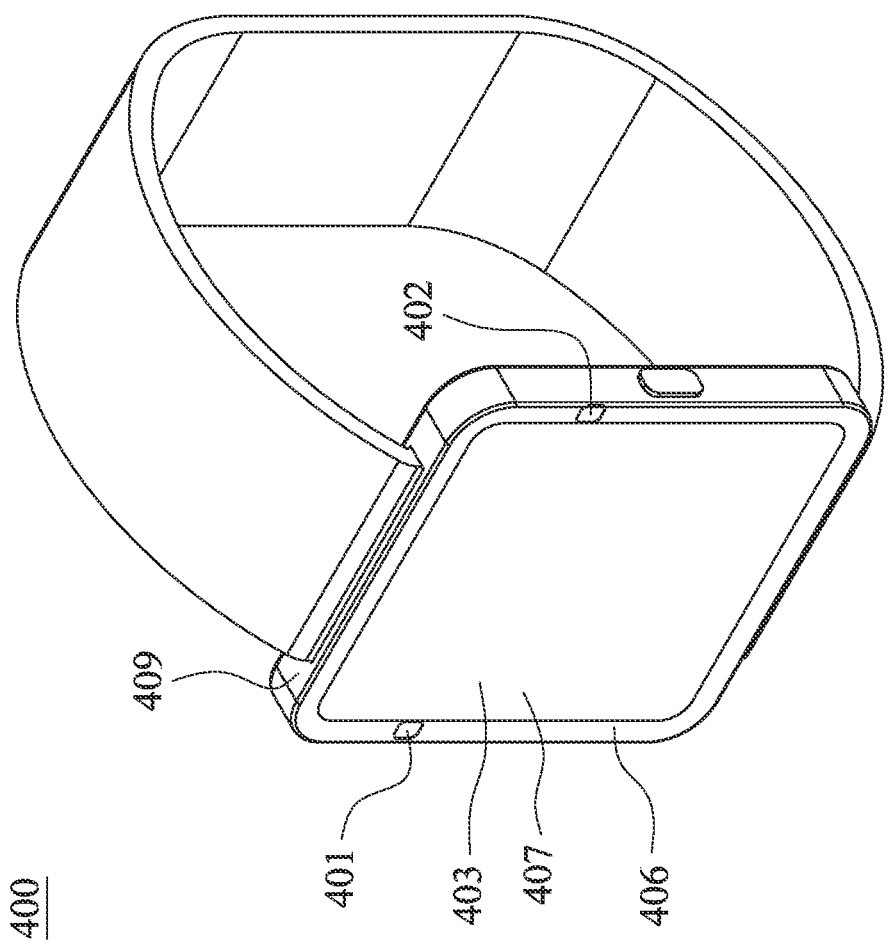
FIG. 4A is a three-dimensional view of an electronic device according to the 4th embodiment of the present disclosure.
Figure 4B:
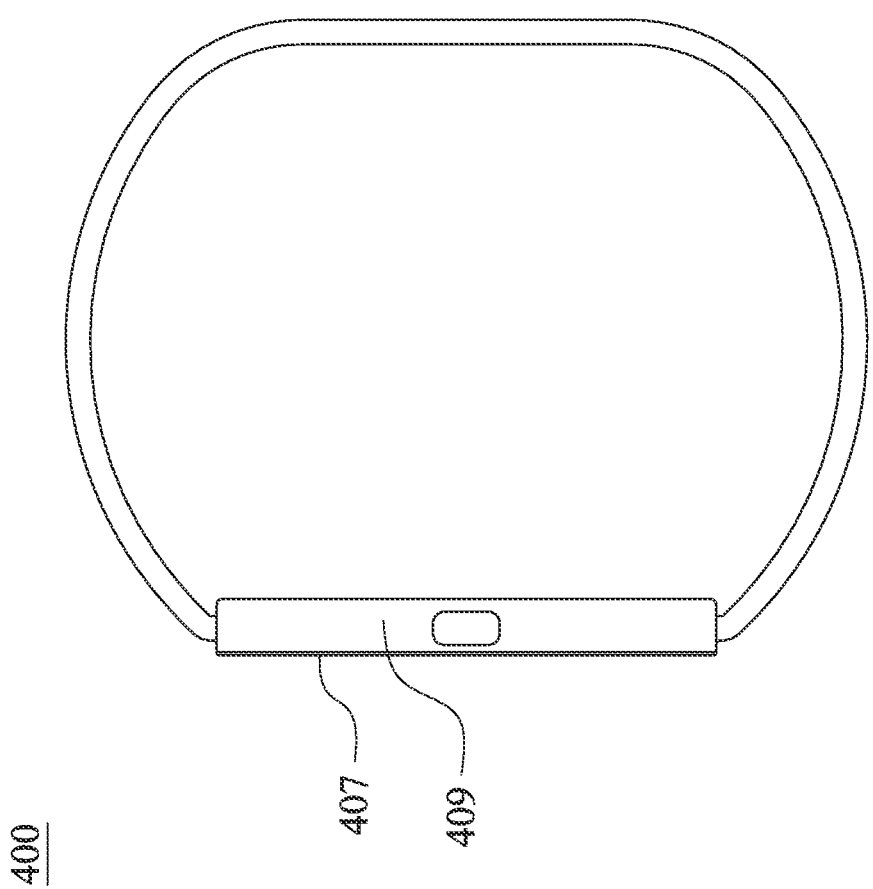
FIG. 4B is a side view of the electronic device in FIG. 4A according to the 4th embodiment.
Figure 4C:
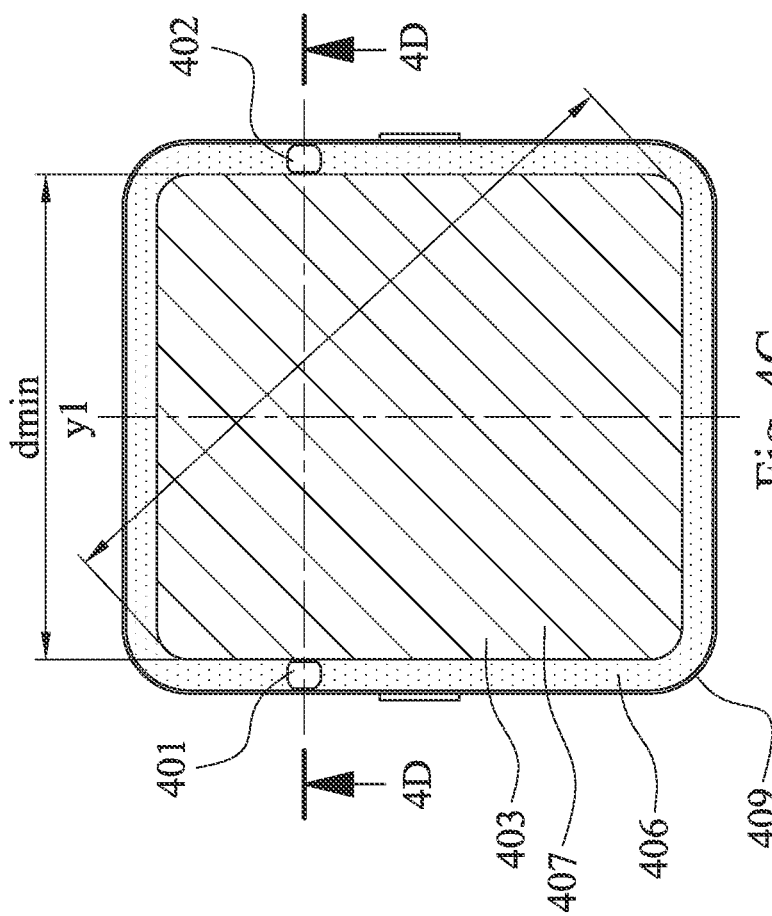
FIG. 4C is a front view of a display screen, a first aperture region and a second aperture region of the electronic device in FIG. 4A according to the 4th embodiment.
Figure 4D:
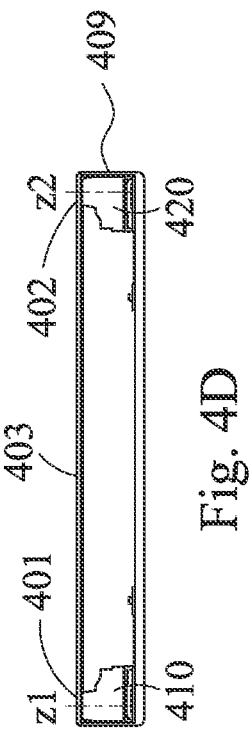
FIG. 4D is a cross-sectional view along line 4D-4D in FIG. 4C.
Figure 4E:
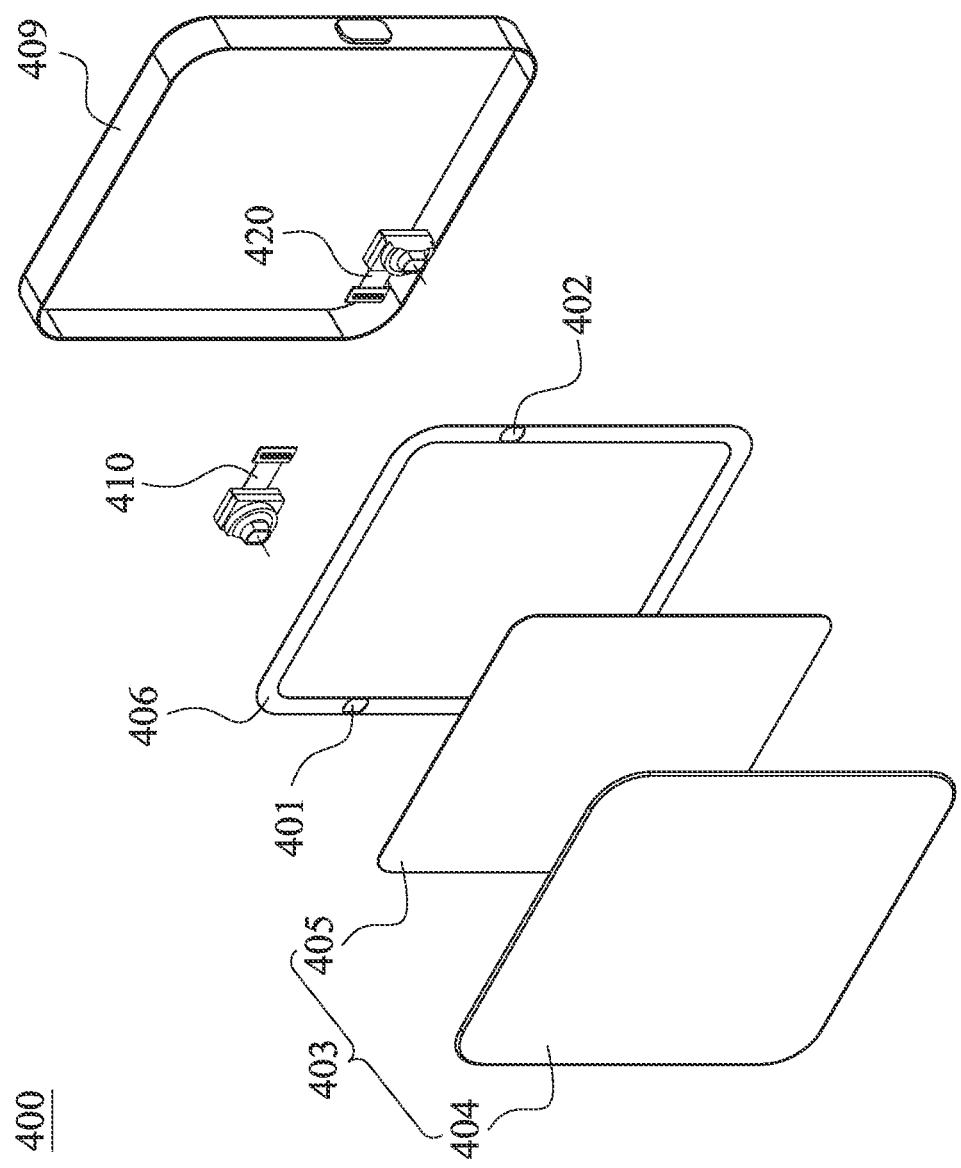
FIG. 4E is an exploded view of the electronic device in FIG. 4C according to the 4th embodiment.

FIG. 4A is a three-dimensional view of an electronic device 400 according to the 4th embodiment of the present disclosure, FIG. 4B is a side view of the electronic device 400 in FIG. 4A according to the 4th embodiment, FIG. 4C is a front view of a display screen 403, a first aperture region 401 and a second aperture region 402 of the electronic device 400 in FIG. 4A according to the 4th embodiment, FIG. 4D is a cross-sectional view along line 4D-4D in FIG. 4C, and FIG. 4E is an exploded view of the electronic device 400 in FIG. 4C according to the 4th embodiment. With reference to FIG. 4A to FIG. 4E, the electronic device 400 includes the display screen 403, the first aperture region 401 and the second aperture region 402. The electronic device 400 is a smart watch, which is a kind of wearable devices. The display screen 403 is disposed and exposed on a surface 407 of the electronic device 400 and in a rectangular shape. The first aperture region 401 is disposed and exposed on the surface 407 of the electronic device 400, and a visible light is able to enter into the internal portion of the electronic device 400 through the first aperture region 401. The second aperture region 402 is disposed and exposed on the surface 407 of the electronic device 400, and the visible light is able to enter into the internal portion of the electronic device 400 through the second aperture region 402.

FIG. 4F is a schematic view of parameters of the electronic device 400 in FIG. 4A according to the 1st embodiment, and FIG. 4G is a schematic view of the first aperture region 401 of the electronic device 400 according to the 4th embodiment. With reference to FIG. 4C, FIG. 4F and FIG. 4G, the display screen 403 is disposed between the first aperture region 401 and the second aperture region 402 and configured to be a spacing dAB maintained therebetween, and a shape of the first aperture region 401 and a shape of the second aperture region 402 are non-circular (as shown in FIG. 4C and FIG. 4F) and mirror-symmetrical to each other with respect to a reference plane y1 being virtual.

With reference to FIG. 4C to FIG. 4E, specifically, the display screen 403 and a screen frame 406 are exposed on and form the surface 407 of the electronic device 400. The display screen 403 includes a touch panel 404 and a display layer 405 in order from the surface 407 to the internal portion of the electronic device 400. The screen frame 406 surrounds the display screen 403 and is connected to a housing 409. The first aperture region 401 and the second aperture region 402 are disposed on the screen frame 406.

FIG. 4H is a schematic view of a second opening 426 of the electronic device according to the 4th embodiment. With reference to FIG. 4C to FIG. 4H, the electronic device 400 further includes a first imaging lens assembly 410 and a second imaging lens assembly 420. The first imaging lens assembly 410 is located in the internal portion of the electronic device 400 and faces the first aperture region 401, and the visible light passing through the first aperture region 401 is able to enter into the first imaging lens assembly 410. The second imaging lens assembly 420 is located in the internal portion of the electronic device 400 and faces the second aperture region 402, and the visible light passing through the second aperture region 402 is able to enter into the second imaging lens assembly 420. The display screen 403 is disposed between the first imaging lens assembly 410 and the second imaging lens assembly 420 and configured to be a spacing d'AB maintained therebetween. In addition, a shape of a first opening 416 of the first imaging lens assembly 410 and a shape of the second opening 426 of the second imaging lens assembly 420 are non-circular (as shown in FIG. 4F) and mirror-symmetrical to each other with respect to the reference plane y1. A boundary of the first aperture region 401 correspondingly surrounds a boundary of the first opening 416, and a boundary of the second aperture region 402 correspondingly surrounds a boundary of the second opening 426, as shown in FIG. 4F.

In detail, with reference to FIG. 4G, a non-circular area A' of the first aperture region 401 is shrunk from an area A of a circle 401c corresponding to a maximum radius RA defined by the first aperture region 401. Specifically, the circle 401c, which has two ends vertical to and two ends parallel to the reference plane y1 in FIG. 4C being shrunk, forms a non-circular shape of the first aperture region 401. Regarding removed areas vertical to the reference plane y1, the removed area close to the reference plane y1 is more than the removed area far from the reference plane y1. Regarding removed areas parallel to the reference plane y1, the removed areas close to and far from the reference plane y1 are equal. In an embodiment according to the present disclosure, a circle, which has at least one end of two ends vertical to a reference plane, two ends parallel to the reference plane and an end in any direction being shrunk, may form a non-circular shape of a first aperture region.

With reference to FIG. 4H, a non-circular area b' of the shape of the second opening 426 is shrunk from an area b of a circle 426c corresponding to a maximum radius rb defined by the shape of the second opening 426. Specifically, the circle 426c with two ends, which are respectively close to and far from the reference plane y1 in FIG. 4C, being shrunk forms a non-circular shape of the second opening 426, and shrunk areas being close to and far from the reference plane y1 are equal. In an embodiment according to the present disclosure, a circle, which has at least one end of two ends vertical to a reference plane, two ends parallel to the reference plane and an end in any direction being shrunk, may form a non-circular shape of a second opening. Furthermore, a first optical axis z1 of the first imaging lens assembly 410 and a second optical axis z2 of the second imaging lens assembly 420 are substantially parallel to each other.

With reference to FIG. 4F, the first imaging lens assembly 410 includes a first image sensor disposed on an image surface of the first imaging lens assembly 410, and a first imaging area 418 of the first image sensor is corresponding to the image surface. A geometric center 419 of the first imaging area 418 and the first optical axis z1 of the first imaging lens assembly 410 are misaligned, a first misalignment distance dF1 can be defined therebetween, and the first optical axis z1 is located farther from the reference plane y1 in FIG. 4C than the geometric center 419 therefrom.

The second imaging lens assembly 420 includes a second image sensor disposed on an image surface of the second imaging lens assembly 420, and a second imaging area 428 of the second image sensor is corresponding to the image surface. A geometric center 429 of the second imaging area 428 and the second optical axis z2 of the second imaging lens assembly 420 are misaligned, a second misalignment distance dF2 (as shown in FIG. 4F) can be defined therebetween, and the second optical axis z2 is located farther from the reference plane y1 in FIG. 4C than the geometric center 429 therefrom. Furthermore, the structures and the optical properties of the corresponding elements of the first imaging lens assembly 410 and the second imaging lens assembly 420 may be mirror-symmetrical with respect to the reference plane y1 shown in FIG. 4C.

With reference to FIG. 4B, the spacing between the first aperture region 401 and the second aperture region 402 is dAB, the spacing between the first imaging lens assembly 410 and the second imaging lens assembly 420 is d'AB, a longest straight-line distance defined by the display screen 403 is dmax, a shortest straight-line distance defined by the display screen 403 is dmin, a maximum image height of the first imaging lens assembly 410 is 1.0F1, and a maximum image height of the second imaging lens assembly 420 is 1.0F2. The geometric center 419 of the first imaging area 418 and the first optical axis z1 of the first imaging lens assembly 410 are misaligned, and the first misalignment distance defined therebetween is dF1. The geometric center 429 of the second imaging area 428 and the second optical axis z2 of the second imaging lens assembly 420 are misaligned, and the second misalignment distance defined therebetween is dF2. A pixel size of the first image sensor is P1, a pixel size of the second image sensor is P2, a focal length of the first imaging lens assembly 410 is efl1, and a focal length of the second imaging lens assembly 420 is efl2. The area of the circle 401c corresponding to the maximum radius RA defined by the first aperture region 401 is A, and the non-circular area of the first aperture region 401 is A'. The area of the circle 426c corresponding to the maximum radius rb defined by the shape of the second opening 426 is b, and the non-circular area of the shape of the second opening 426 is b'. The data of the aforementioned parameters of the electronic device 400 according to the 4th embodiment are listed in the following Table 4.

TABLE 4

| 4th Embodiment | |
| --- | --- |
| dAB (mm) | 37.16 |
| d'AB (mm) | 37.36 |
| dmax (mm) | 52.22 |
| dmin (mm) | 36.80 |
| 1.0F1 (mm) | 2.000 |
| 1.0F2 (mm) | 2.000 |
| dF1 (mm) | 0.300 |
| dF2 (mm) | 0.300 |
| P1 (um) | 0.6 |
| P2 (um) | 0.6 |
| efl1 (mm) | 3.74 |
| efl2 (mm) | 3.74 |
| efl1/efl2 | 1 |
| A (mm$^2$) | 5.896 |
| A' (mm$^2$) | 4.858 |
| b (mm$^2$) | 3.597 |
| b' (mm$^2$) | 3.127 |

5th Embodiment

Figure 5A:
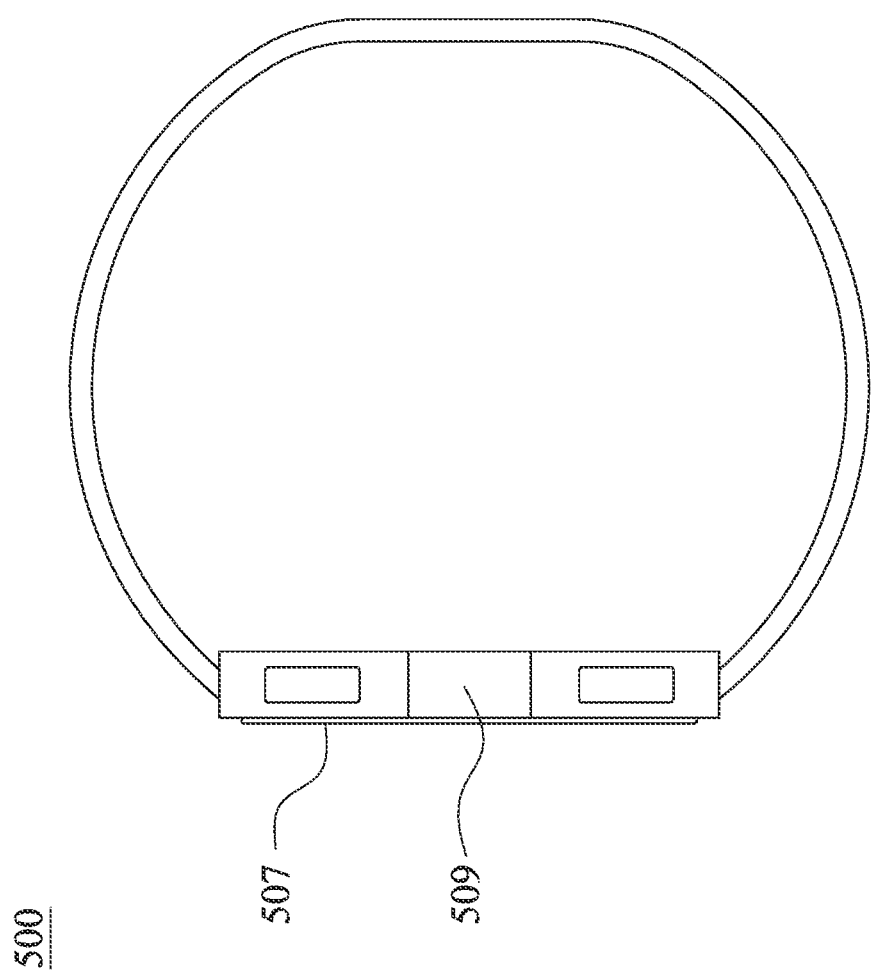
FIG. 5A is a side view of an electronic device according to the 5th embodiment of the present disclosure.
Figure 5B:
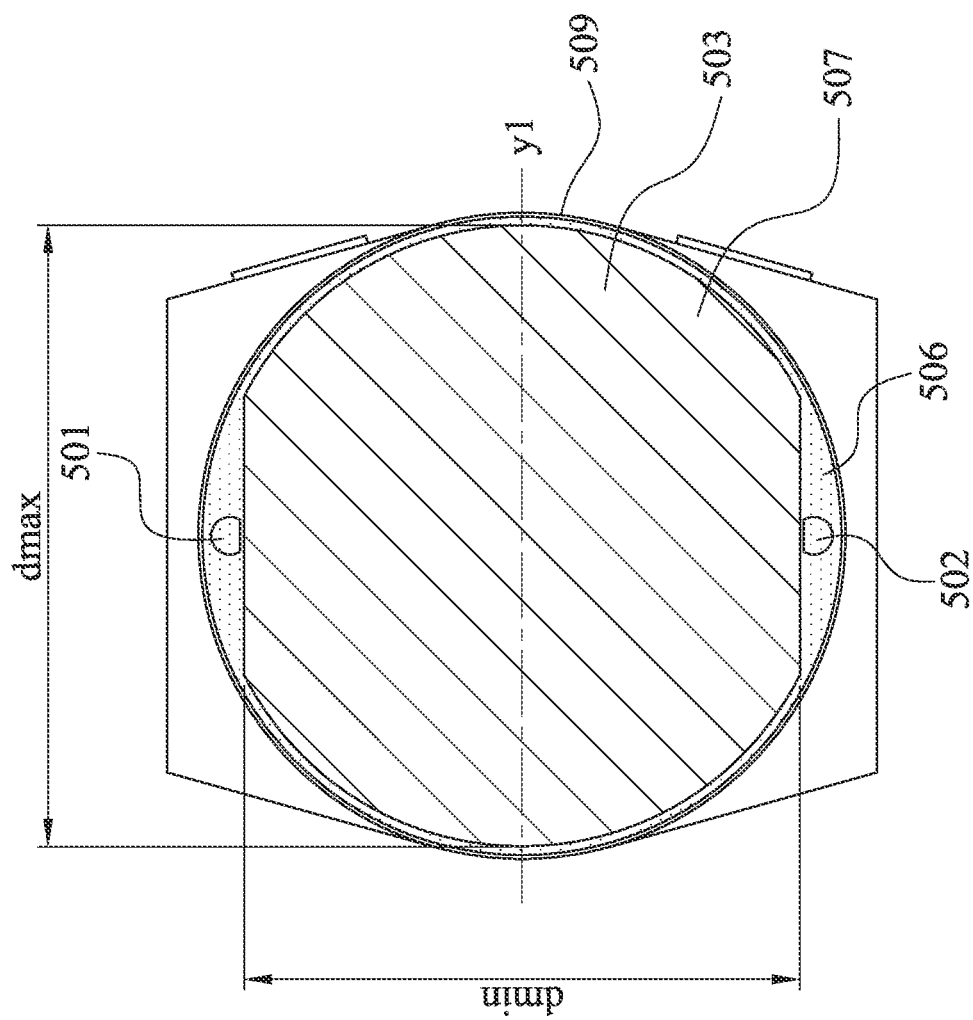
FIG. 5B is a front view of a display screen, a first aperture region and a second aperture region of the electronic device in FIG. 5A according to the 5th embodiment.

FIG. 5A is a side view of an electronic device 500 according to the 5th embodiment of the present disclosure, and FIG. 5B is a front view of a display screen 503, a first aperture region 501 and a second aperture region 502 of the electronic device 500 in FIG. 5A according to the 5th embodiment. With reference to FIG. 5A and FIG. 5B, the electronic device 500 includes the display screen 503, the first aperture region 501 and the second aperture region 502. The electronic device 500 is a smart watch, which is a kind of wearable devices. The display screen 503 is disposed and exposed on a surface 507 of the electronic device 500 and in a symmetrical shape, which is shrunk from two symmetrical ends of a reference plane y1 being virtual of a circular shape. The first aperture region 501 is disposed and exposed on the surface 507 of the electronic device 500, and a visible light is able to enter into the internal portion of the electronic device 500 through the first aperture region 501. The second aperture region 502 is disposed and exposed on the surface 507 of the electronic device 500, and the visible light is able to enter into the internal portion of the electronic device 500 through the second aperture region 502.

Figure 5D:
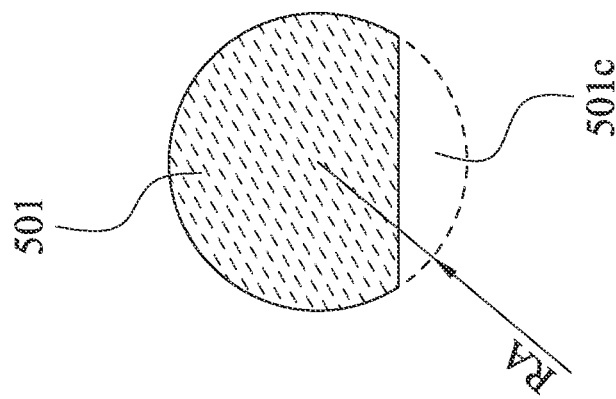
FIG. 5D is a schematic view of a first aperture region of the electronic device according to the 5th embodiment.
Figure 5C:
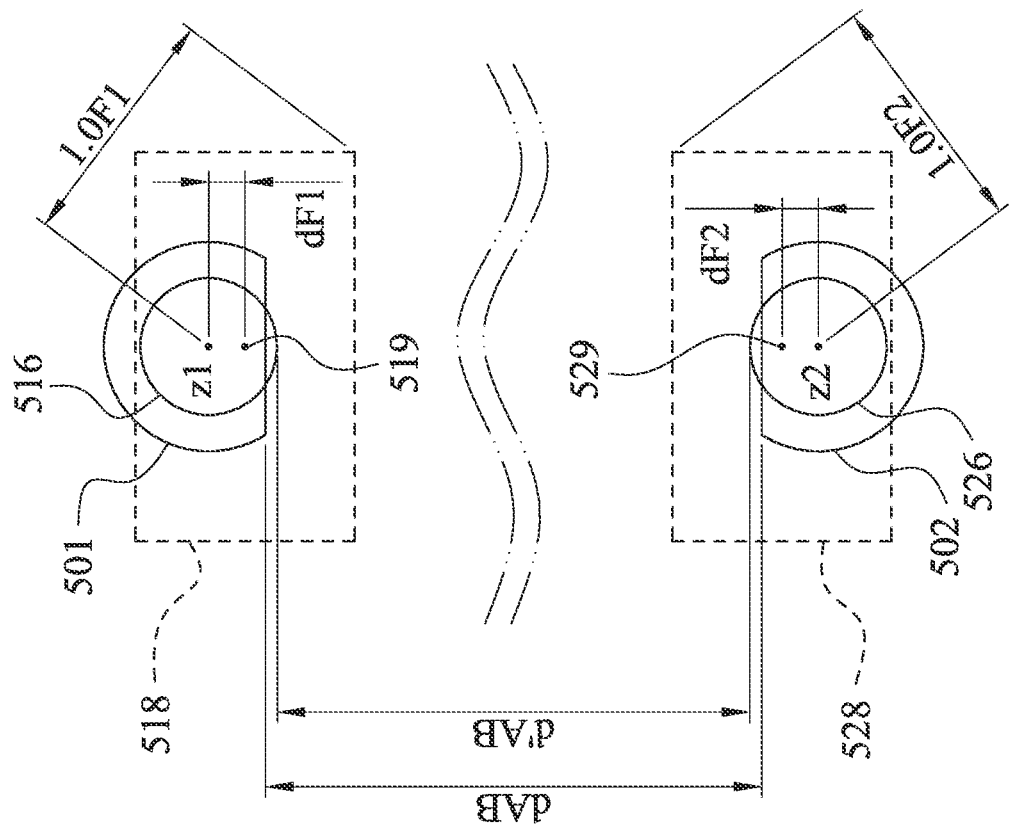
FIG. 5C is a schematic view of parameters of the electronic device in FIG. 5A according to the 5th embodiment.

FIG. 5C is a schematic view of parameters of the electronic device 500 in FIG. 5A according to the 5th embodiment, and FIG. 5D is a schematic view of the first aperture region 501 of the electronic device 500 according to the 5th embodiment. With reference to FIG. 5B to FIG. 5D, the display screen 503 is disposed between the first aperture region 501 and the second aperture region 502 and configured to be a spacing dAB maintained therebetween, and a shape of the first aperture region 501 and a shape of the second aperture region 502 are non-circular (as shown in FIG. 5B and FIG. 5C) and mirror-symmetrical to each other with respect to the reference plane y1 being virtual.

With reference to FIG. 5A and FIG. 5B, specifically, the display screen 503 and a screen frame 506 are exposed on and form the surface 507 of the electronic device 500. The screen frame 506 surrounds the display screen 503 and is connected to a housing 509. The first aperture region 501 and the second aperture region 502 are disposed on the screen frame 506.

With reference to FIG. 5B to FIG. 5C, the electronic device 500 further includes a first imaging lens assembly and a second imaging lens assembly. The first imaging lens assembly is located in the internal portion of the electronic device 500 and faces the first aperture region 501, and the visible light passing through the first aperture region 501 is able to enter into the first imaging lens assembly. The second imaging lens assembly is located in the internal portion of the electronic device 500 and faces the second aperture region 502, and the visible light passing through the second aperture region 502 is able to enter into the second imaging lens assembly. The display screen 503 is disposed between the first imaging lens assembly and the second imaging lens assembly and configured to be a spacing d'AB maintained therebetween. In addition, a shape of a first opening 516 of the first imaging lens assembly and a shape of the second opening 526 of the second imaging lens assembly are circular (as shown in FIG. 5C) and mirror-symmetrical to each other with respect to the reference plane y1. The first aperture region 501 and the first opening 516 are partially overlapped, and the second aperture region 502 and the second opening 526 are partially overlapped, as shown in FIG. 5C.

In detail, with reference to FIG. 5D, a non-circular area A' of the first aperture region 501 is shrunk from an area A of a circle 501c corresponding to a maximum radius RA defined by the first aperture region 501. Specifically, the circle 301c with one end, which is close to the reference plane y1 in FIG. 5B, being shrunk forms a non-circular shape of the first aperture region 501. Furthermore, a first optical axis z1 of the first imaging lens assembly and a second optical axis z2 of the second imaging lens assembly are substantially parallel to each other.

With reference to FIG. 5C, the first imaging lens assembly includes a first image sensor disposed on an image surface of the first imaging lens assembly, and a first imaging area 518 of the first image sensor is corresponding to the image surface. A geometric center 519 of the first imaging area 518 and the first optical axis z1 of the first imaging lens assembly are misaligned, a first misalignment distance dF1 can be defined therebetween, and the first optical axis z1 is located farther from the reference plane y1 in FIG. 5B than the geometric center 519 therefrom.

The second imaging lens assembly includes a second image sensor disposed on an image surface of the second imaging lens assembly, and a second imaging area 528 of the second image sensor is corresponding to the image surface. A geometric center 529 of the second imaging area 528 and the second optical axis z2 of the second imaging lens assembly are misaligned, a second misalignment distance dF2 (as shown in FIG. 5C) can be defined therebetween, and the second optical axis z2 is located farther from the reference plane y1 in FIG. 5B than the geometric center 529 therefrom. Furthermore, the structures and the optical properties of the corresponding elements of the first imaging lens assembly and the second imaging lens assembly may be mirror-symmetrical with respect to the reference plane y1 shown in FIG. 5B.

With reference to FIG. 5B and FIG. 5C, the spacing between the first aperture region 501 and the second aperture region 502 is dAB, the spacing between the first imaging lens assembly and the second imaging lens assembly is d'AB, a longest straight-line distance defined by the display screen 503 is dmax, a shortest straight-line distance defined by the display screen 503 is dmin, a maximum image height of the first imaging lens assembly is 1.0F1, and a maximum image height of the second imaging lens assembly is 1.0F2. The geometric center 519 of the first imaging area 518 and the first optical axis z1 of the first imaging lens assembly are misaligned, and the first misalignment distance defined therebetween is dF1. The geometric center 529 of the second imaging area 528 and the second optical axis z2 of the second imaging lens assembly are misaligned, and the second misalignment distance defined therebetween is dF2. A pixel size of the first image sensor is P1, a pixel size of the second image sensor is P2, a focal length of the first imaging lens assembly is efl1, and a focal length of the second imaging lens assembly is efl2. The area of the circle 501c corresponding to the maximum radius RA defined by the first aperture region 501 is A, and the non-circular area of the first aperture region 501 is A'. The data of the aforementioned parameters of the electronic device 500 according to the 5th embodiment are listed in the following Table 5.

TABLE 5

| 5th Embodiment | |
|---|---|
| dAB (mm) | 35.7 |
| d'AB (mm) | 35.43 |
| dmax (mm) | 39.40 |
| dmin (mm) | 35.20 |
| 1.0F1 (mm) | 2.782 |
| 1.0F2 (mm) | 2.782 |
| dF1 (mm) | 0.417 |
| dF2 (mm) | 0.417 |
| P1 (um) | 0.8 |
| P2 (um) | 0.8 |
| efl1 (mm) | 3.27 |
| efl2 (mm) | 3.27 |
| efl1/efl2 | 1 |
| A (mm$^2$) | 4.524 |
| A' (mm$^2$) | 3.742 |

6th Embodiment

Figure 6A:
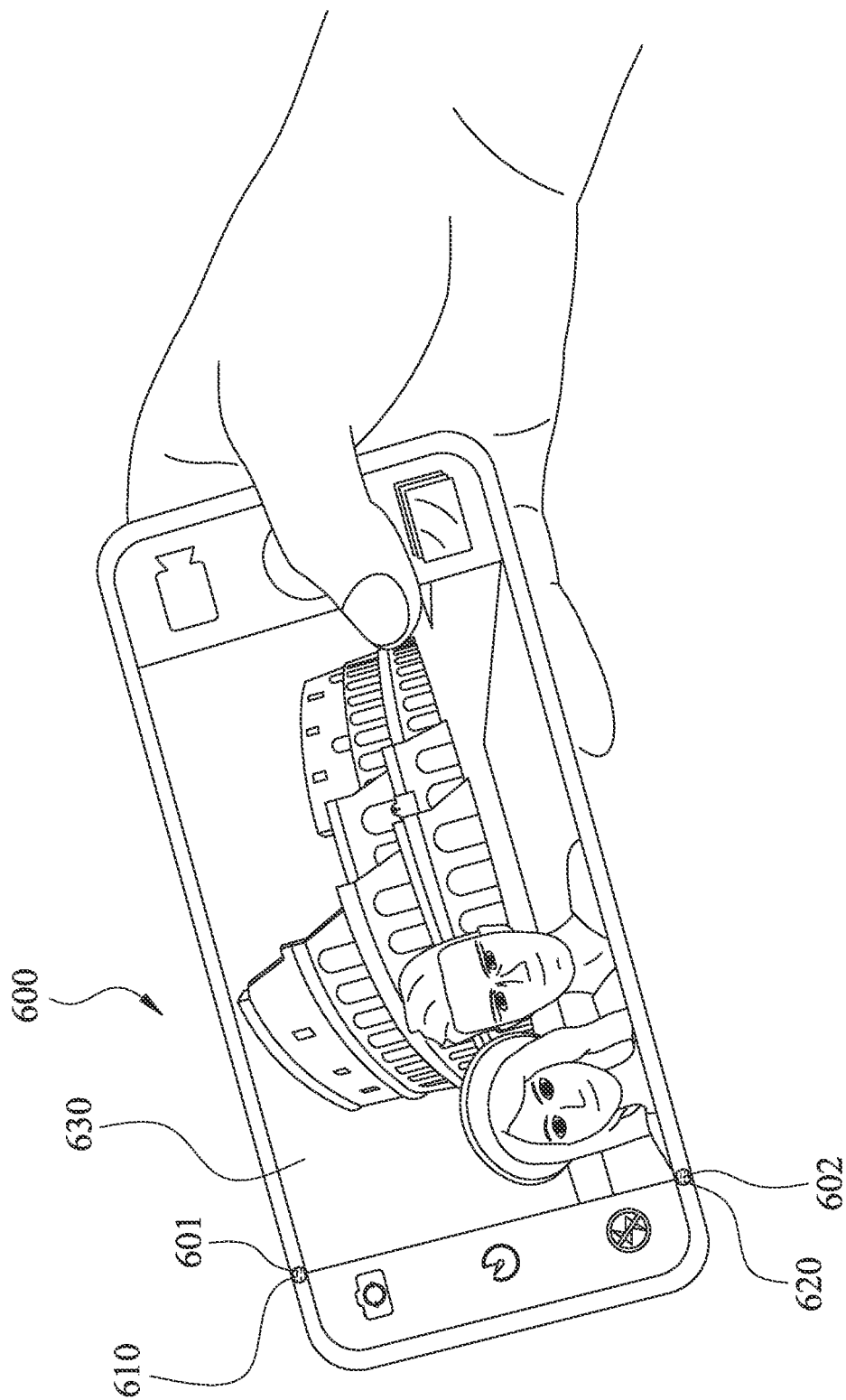
FIG. 6A is a schematic view of an electronic device according to the 6th embodiment of the present disclosure.
Figure 6B:
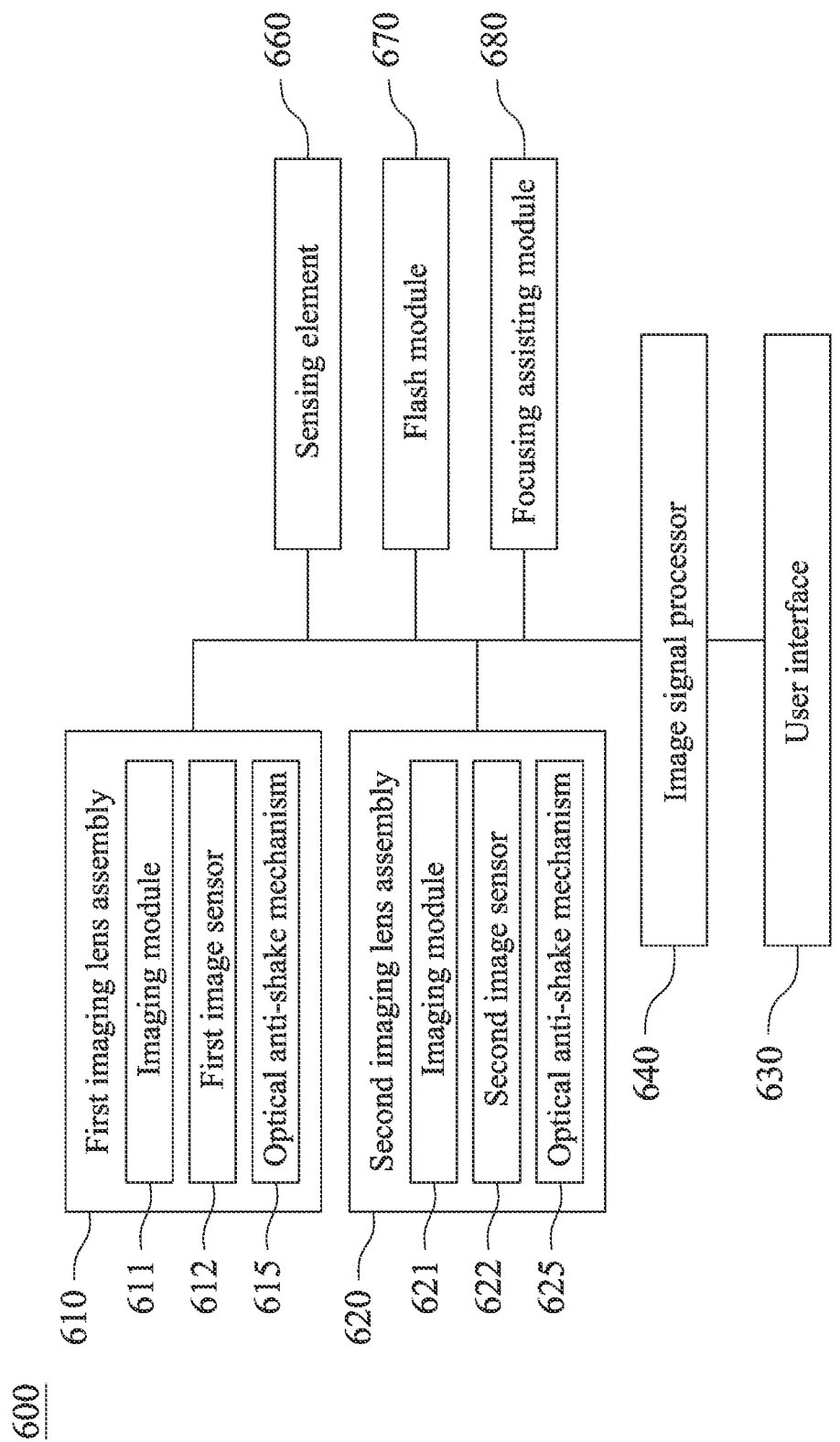
FIG. 6B is a block diagram of the electronic device in FIG. 6A according to the 6th embodiment.

FIG. 6A is a schematic view of an electronic device 600 according to the 6th embodiment of the present disclosure, and FIG. 6B is a block diagram of the electronic device 600 in FIG. 6A according to the 6th embodiment. With reference to FIGS. 6A and 6B, the electronic device 600 is a smart phone, and includes a first imaging lens assembly 610, a second imaging lens assembly 620 and a user interface 630. The first imaging lens assembly 610 faces a first aperture region 601, and includes an imaging module 611 and a first image sensor 612. The second imaging lens assembly 620 faces a second aperture region 602, and includes an imaging module 621 and a second image sensor 622. The first imaging lens assembly 610 and the second imaging lens assembly 620 are disposed on positions in two side directions from the user interface 630 (i.e., on a screen frame). The user interface 630 is a display screen and may also be a touch screen, but not limited thereto. The electronic device 600 may be any of the electronic device 100 of the 1st embodiment to the electronic device 300 of the 3rd embodiment being aforementioned, or may be one adaptively adjusted from any of the electronic device 400 of the 4th embodiment and the electronic device 500 of the 5th embodiment, but not limited thereto.

In addition, the electronic device 600 can further include but not be limited to a control unit, a storage unit, a random access memory, a read-only memory, or a combination thereof.

Figure 6C:
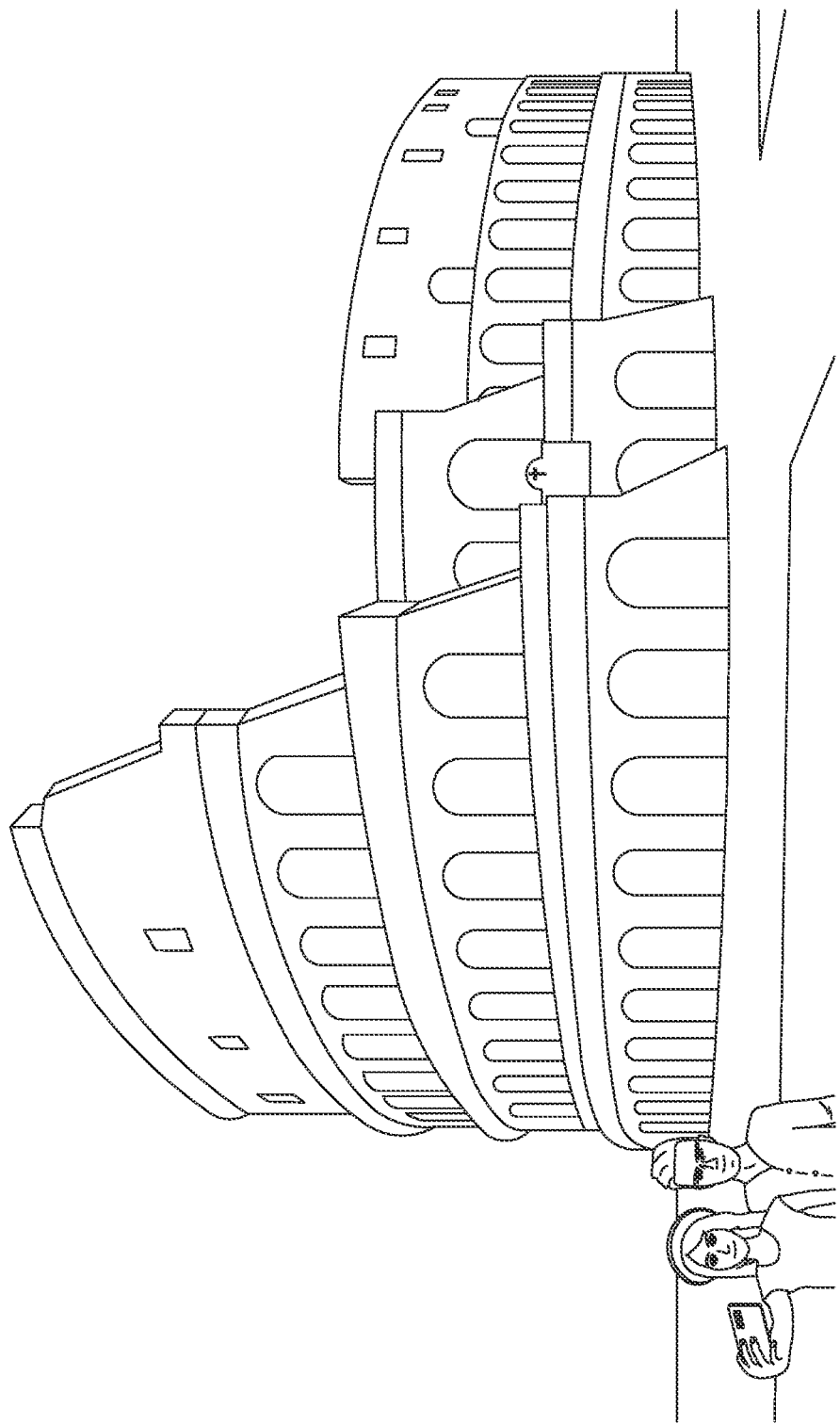
FIG. 6C is a schematic view of a selfie scene of the electronic device in FIG. 6A according to the 6th embodiment.

FIG. 6C is a schematic view of a selfie scene of the electronic device 600 in FIG. 6A according to the 6th embodiment, and FIG. 6D is a schematic view of a single display image 600*i* merged with a captured image 610*i* of the first imaging lens assembly 610 and a captured image 620*i* of the second imaging lens assembly 620 of the electronic device 600 in FIG. 6A according to the 6th embodiment. With reference to FIGS. 6C and 6D, the first imaging lens assembly 610, the second imaging lens assembly 620 and the user interface 630 all face toward a user. While proceeding a selfie or a live streaming, the captured image 610*i* of the first imaging lens assembly 610 and the captured image 620*i* of the second imaging lens assembly 620 can be merged into the single display image 600*i* based on the program codes of the storage unit or the read-only memory of the electronic device 600 (but not limited thereto), so that the user can watch the display image 600*i* and perform the interface operation at the same time. After shooting, the display image 600*i* as shown in FIG. 6D can be obtained, stored or transmitted. Therefore, the configuration of the electronic device 600 with the first imaging lens assembly 610 and the second imaging lens assembly 620 of the present disclosure is advantageous in providing a better shooting experience.

Furthermore, the user activates the capturing mode via the user interface 630 of the electronic device 600. At this moment, the imaging light of the imaging module 611 is converged on the first image sensor 612, the imaging light of the imaging module 621 is converged on the second image sensor 622, and the electronic signal associated with image is output to an image signal processor (ISP) 640.

To meet a specification of a camera of the electronic device 600, the electronic device 600 can further include optical anti-shake mechanisms 615, 625, which can be an optical image stabilization (OIS). Furthermore, the electronic device 600 can further include at least one auxiliary optical element (its reference numeral is omitted) and at least one sensing element 660. According to the 6th embodiment, the auxiliary optical element is a flash module 670 and a focusing assisting module 680. The flash module 670 can be configured to compensate a color temperature, and the focusing assisting module 680 can be an infrared distance measurement component, a laser focus module, etc. The sensing element 660 can have functions for sensing physical momentum and kinetic energy, such as an accelerator, a gyroscope, a Hall Effect Element, to sense shaking or jitters applied by hands of the user or external environments. Accordingly, the first imaging lens assembly 610 and the second imaging lens assembly 620 of the electronic device 600 equipped with an auto-focusing mechanism and the optical anti-shake mechanisms 615, 625 can be enhanced to achieve the superior image quality. Furthermore, the electronic device 600 according to the present disclosure can have a capturing function with multiple modes, such as taking optimized selfies, high dynamic range (HDR) under a low light condition, 4K resolution recording, etc. Furthermore, the users can visually see the display image 600*i* merged with the captured image 610*i* and the captured image 620*i* through the user interface 630 (i.e., the display screen, the touch screen) and manually operate the view finding range on the user interface 630 to achieve the autofocus function of what you see is what you get.

The foregoing description, for purpose of explanation, has been described with reference to specific embodiments. It is to be noted that Tables show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An electronic device, comprising:
a display screen disposed on a surface of the electronic device;
a first aperture region disposed on the surface of the electronic device, wherein a visible light is able to enter into an internal portion of the electronic device through the first aperture region; and
a second aperture region disposed on the surface of the electronic device, wherein the visible light is able to enter into the internal portion of the electronic device through the second aperture region;
wherein the display screen is disposed between the first aperture region and the second aperture region and configured to be a spacing maintained therebetween, and a shape of the first aperture region and a shape of the second aperture region are non-circular and mirror-symmetrical to each other;
wherein the spacing between the first aperture region and the second aperture region is dAB, a shortest straight-line distance defined by the display screen is dmin, a longest straight-line distance defined by the display screen is dmax, and the following conditions are satisfied:

$$0.84 \times d\text{min} < dAB < 1.31 \times d\text{max}; \text{ and}$$

$$0.47 \times d\text{max} < d\text{min} < d\text{max}.$$

2. The electronic device of claim 1, further comprising:
a first imaging lens assembly located in the internal portion of the electronic device and facing the first aperture region, wherein the visible light passing through the first aperture region is able to enter into the first imaging lens assembly.

3. The electronic device of claim 2, further comprising:
a second imaging lens assembly located in the internal portion of the electronic device and facing the second aperture region, wherein the visible light passing through the second aperture region is able to enter into the second imaging lens assembly.

4. The electronic device of claim 3, wherein a spacing between the first imaging lens assembly and the second imaging lens assembly is d'AB, the shortest straight-line distance defined by the display screen is dmin, the longest straight-line distance defined by the display screen is dmax, and the following condition is satisfied:

$$0.83 \times d\text{min} < d'AB < 1.29 \times d\text{max}.$$

5. The electronic device of claim 3, wherein the second imaging lens assembly comprises:
a second image sensor disposed on an image surface of the second imaging lens assembly, wherein a second imaging area of the second image sensor is corresponding to the image surface, a geometric center of the second imaging area and a second optical axis of the second imaging lens assembly are misaligned, a second misalignment distance defined therebetween is dF2, a maximum image height of the second imaging lens assembly is 1.0F2, and the following condition is satisfied:

$0 \leq dF2 < (1.0F2) \times 1.1$.

6. The electronic device of claim 3, wherein the first imaging lens assembly comprises:
a first image sensor disposed on an image surface of the first imaging lens assembly, wherein a first imaging area of the first image sensor is corresponding to the image surface, a geometric center of the first imaging area and a first optical axis of the first imaging lens assembly are misaligned, a first misalignment distance defined therebetween is dF1, a maximum image height of the first imaging lens assembly is 1.0F1, and the following condition is satisfied:

$0 \leq dF1 < (1.0F1) \times 1.1$.

7. The electronic device of claim 5, wherein a pixel size of the second image sensor is P2, and the following condition is satisfied:

$0.1 \ \mu m < P2 < 0.95 \ \mu m$.

8. The electronic device of claim 7, wherein the pixel size of the second image sensor is P2, and the following condition is satisfied:

$0.1 \ \mu m < P2 < 0.83 \ \mu m$.

9. The electronic device of claim 6, wherein the first optical axis and a second optical axis of the second imaging lens assembly are substantially parallel to each other.

10. The electronic device of claim 9, wherein a non-circular area of the first aperture region is shrunk from a circular area corresponding to a maximum radius defined by the first aperture region, the non-circular area of the first aperture region is A', the circular area corresponding to the maximum radius defined by the first aperture region is A, and the following condition is satisfied:

$0.2 \times A \leq A' < 1.03 \times A$.

11. The electronic device of claim 4, wherein a focal length of the first imaging lens assembly is efl1, a focal length of the second imaging lens assembly is efl2, and the following conditions are satisfied:

$2.0 \ mm \leq efl1 \leq 4.2 \ mm$, $2.0 \ mm \leq efl2 \leq 4.2 \ mm$; and $0.8 < efl1/efl2 < 1.25$.

12. An electronic device, comprising:
a display screen disposed on a surface of the electronic device;
a first aperture region disposed on the surface of the electronic device, wherein a visible light is able to enter into an internal portion of the electronic device through the first aperture region;
a second aperture region disposed on the surface of the electronic device, wherein the visible light is able to enter into the internal portion of the electronic device through the second aperture region;
a first imaging lens assembly located in the internal portion of the electronic device and facing the first aperture region; and
a second imaging lens assembly located in the internal portion of the electronic device and facing the second aperture region;
wherein the display screen is disposed between the first imaging lens assembly and the second imaging lens assembly and configured to be a spacing maintained therebetween, and a shape of a first opening of the first imaging lens assembly and a shape of a second opening of the second imaging lens assembly are non-circular and mirror-symmetrical to each other;
wherein the spacing between the first imaging lens assembly and the second imaging lens assembly is d'AB, a shortest straight-line distance defined by the display screen is dmin, a longest straight-line distance defined by the display screen is dmax, and the following conditions are satisfied:

$0.84 \times dmin < d'AB < 1.26 \times dmax$; and $0.47 \times dmax < dmin < dmax$.

13. The electronic device of claim 12, wherein the first imaging lens assembly comprises:
a first image sensor disposed on an image surface of the first imaging lens assembly, wherein a first imaging area of the first image sensor is corresponding to the image surface, a geometric center of the first imaging area and a first optical axis of the first imaging lens assembly are misaligned, a first misalignment distance defined therebetween is dF1, a maximum image height of the first imaging lens assembly is 1.0F1, and the following condition is satisfied:

$0 \leq dF1 < (1.0F1) \times 1.1$.

14. The electronic device of claim 13, wherein a pixel size of the first image sensor is P1, and the following condition is satisfied:

$0.1 \ \mu m < P1 < 0.95 \ \mu m$.

15. The electronic device of claim 14, wherein the pixel size of the first image sensor is P1, and the following condition is satisfied:

$0.1 \ \mu m < P1 < 0.83 \ \mu m$.

16. The electronic device of claim 12, wherein the second imaging lens assembly comprises:
a second image sensor disposed on an image surface of the second imaging lens assembly, wherein a second imaging area of the second image sensor is corresponding to the image surface, a geometric center of the second imaging area and a second optical axis of the second imaging lens assembly are misaligned, a second misalignment distance defined therebetween is dF2, a maximum image height of the second imaging lens assembly is 1.0F2, and the following condition is satisfied:

$0 \leq dF2 < (1.0F2) \times 1.1$.

17. The electronic device of claim 16, wherein the second optical axis and a first optical axis of the first imaging lens assembly are substantially parallel to each other.

18. The electronic device of claim 17, wherein a non-circular area of a shape of the second opening is shrunk from a circular area corresponding to a maximum radius defined by the shape of the second opening, the non-circular area of the shape of the second opening is b', the circular area corresponding to the maximum radius defined by the shape of the second opening is b, and the following condition is satisfied:

$0.2 \times b \leq b' < 1.03 \times b$.

19. The electronic device of claim 12, wherein a focal length of the first imaging lens assembly is efl1, a focal length of the second imaging lens assembly is efl2, and the following conditions are satisfied:

$2.0 \text{ mm} \leq efl1 \leq 4.2 \text{ mm}$, $2.0 \text{ mm} \leq efl2 \leq 4.2 \text{ mm}$; and $0.8 < efl1/efl2 < 1.25$.

20. An electronic device, comprising:
a display screen disposed on a surface of the electronic device;
a first aperture region disposed on the surface of the electronic device, wherein a visible light is able to enter into an internal portion of the electronic device through the first aperture region;
a second aperture region disposed on the surface of the electronic device, wherein the visible light is able to enter into the internal portion of the electronic device through the second aperture region;
a first imaging lens assembly located in the internal portion of the electronic device and facing the first aperture region; and
a second imaging lens assembly located in the internal portion of the electronic device and facing the second aperture region;
wherein the display screen is disposed between the first imaging lens assembly and the second imaging lens assembly and configured to be a spacing maintained therebetween;
wherein the spacing between the first imaging lens assembly and the second imaging lens assembly is d'AB, a shortest straight-line distance defined by the display screen is dmin, a longest straight-line distance defined by the display screen is dmax, a focal length of the first imaging lens assembly is efl1, a focal length of the second imaging lens assembly is efl2, and the following conditions are satisfied:

$0.83 \times d\text{min} < d'AB < 1.26 \times d\text{max}$, $0.47 \times d\text{max} < d\text{min} < d\text{max}$;

$2.0 \text{ mm} \leq efl1 \leq 4.2 \text{ mm}$, $2.0 \text{ mm} \leq efl2 \leq 4.2 \text{ mm}$; and $0.8 < efl1/efl2 < 1.25$.

21. The electronic device of claim 20, wherein a first optical axis of the first imaging lens assembly and a second optical axis of the second imaging lens assembly are substantially parallel to each other.

22. The electronic device of claim 20, wherein a shape of the first aperture region and a shape of the second aperture region are non-circular and mirror-symmetrical to each other.

23. The electronic device of claim 21, wherein the second imaging lens assembly comprises:
a second image sensor disposed on an image surface of the second imaging lens assembly, wherein a second imaging area of the second image sensor is corresponding to the image surface, a geometric center of the second imaging area and a second optical axis of the second imaging lens assembly are misaligned, a second misalignment distance defined therebetween is dF2, a maximum image height of the second imaging lens assembly is 1.0F2, and the following condition is satisfied:

$0 \leq dF2 < (1.0F2) \times 1.1$.

24. The electronic device of claim 21, wherein the first imaging lens assembly comprises:
a first image sensor disposed on an image surface of the first imaging lens assembly, wherein a first imaging area of the first image sensor is corresponding to the image surface, a geometric center of the first imaging area and a first optical axis of the first imaging lens assembly are misaligned, a first misalignment distance defined therebetween is dF1, a maximum image height of the first imaging lens assembly is 1.0F1, and the following condition is satisfied:

$0 \leq dF1 < (1.0F1) \times 1.1$.

25. The electronic device of claim 20, wherein the display screen is disposed between the first aperture region and the second aperture region and configured to be a spacing maintained therebetween, the spacing between the first aperture region and the second aperture region is dAB, the shortest straight-line distance defined by the display screen is dmin, the longest straight-line distance defined by the display screen is dmax, and the following condition is satisfied:

$0.84 \times d\text{min} < dAB < 1.31 \times d\text{max}$.

* * * * *